United States Patent
Hu et al.

(10) Patent No.: US 11,062,252 B1
(45) Date of Patent: *Jul. 13, 2021

(54) WORK RELATED FEEDBACK SYSTEM, METHOD, AND COMPUTER PROGRAM PRODUCT

(71) Applicant: Honest Work Corporation, San Francisco, CA (US)

(72) Inventors: George Hu, San Francisco, CA (US); Ryan O'Donnell, San Francisco, CA (US); Hyon Lee, San Leandro, CA (US); John Boiles, Berkeley, CA (US)

(73) Assignee: HONEST WORK CORPORATION, San Francisco, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 14/842,705

(22) Filed: Sep. 1, 2015

(51) Int. Cl.
*G06Q 10/06* (2012.01)
*G06Q 10/10* (2012.01)

(52) U.S. Cl.
CPC ... *G06Q 10/06398* (2013.01); *G06Q 10/1093* (2013.01)

(58) Field of Classification Search
None
See application file for complete search history.

(56) References Cited

U.S. PATENT DOCUMENTS

| | | | | | |
|---|---|---|---|---|---|
| 6,832,245 | B1* | 12/2004 | Isaacs | ............... | G06Q 10/107 709/206 |
| 7,730,014 | B2* | 6/2010 | Hartenstein | ........ | G06Q 10/109 705/7.19 |
| 9,230,280 | B1* | 1/2016 | Maag | ................. | G06Q 40/00 |
| 10,878,045 | B1* | 12/2020 | Hu | ................ | G06F 16/24578 |
| 2004/0093290 | A1 | 5/2004 | Doss et al. | | |
| 2005/0165631 | A1* | 7/2005 | Horvitz | ......... | G06Q 10/063116 705/7.16 |
| 2005/0197846 | A1* | 9/2005 | Pezaris | .............. | G06Q 30/02 705/319 |
| 2008/0027783 | A1* | 1/2008 | Hughes | .............. | G06Q 10/00 705/7.14 |
| 2008/0086531 | A1* | 4/2008 | Chavda | .............. | G06Q 10/107 709/206 |
| 2009/0307045 | A1* | 12/2009 | Chakra | .............. | G06Q 10/109 705/7.18 |
| 2010/0306185 | A1* | 12/2010 | Smith | ............... | G06Q 10/107 707/709 |
| 2011/0078252 | A1* | 3/2011 | Macwan | ............ | G06Q 30/02 709/206 |

(Continued)

OTHER PUBLICATIONS

Tullio et al., Augmenting Shared Personal Calendars: UIST '02: Proceedings of the 15th annual ACM symposium on User interface software and technology, Oct. 2002, pp. 11-20 (Year: 2002).*

(Continued)

*Primary Examiner* — Brian M Epstein
*Assistant Examiner* — Darlene Garcia-Guerra
(74) *Attorney, Agent, or Firm* — Zilka-Kotab, P.C.

(57) ABSTRACT

A work related feedback system, method, and computer program product are provided. In use, a system is made accessible to a user via a network, where the system has memory and at least one processor. Further, individuals having a work-based relationship with the user are determined, by the system. The user is then allowed, by the system, to provide feedback for the individuals.

15 Claims, 34 Drawing Sheets

(56) References Cited

U.S. PATENT DOCUMENTS

| | | | |
|---|---|---|---|
| 2011/0141974 A1* | 6/2011 | Lieberman | H04L 51/38 |
| | | | 370/328 |
| 2012/0084340 A1* | 4/2012 | McCormack | G06Q 30/01 |
| | | | 709/203 |
| 2012/0102114 A1* | 4/2012 | Dunn | G06Q 10/10 |
| | | | 709/204 |
| 2012/0150888 A1* | 6/2012 | Hyatt | G06F 21/6254 |
| | | | 707/758 |
| 2012/0191500 A1 | 7/2012 | Byrnes et al. | |
| 2012/0197906 A1* | 8/2012 | Landau | G06Q 10/00 |
| | | | 707/748 |
| 2013/0191452 A1* | 7/2013 | Beerse | H04L 65/403 |
| | | | 709/204 |
| 2013/0218993 A1* | 8/2013 | Dhara | G06Q 10/10 |
| | | | 709/206 |
| 2013/0282446 A1* | 10/2013 | Dobell | G06Q 10/06398 |
| | | | 705/7.42 |
| 2013/0325665 A1* | 12/2013 | Shaffer | G09B 7/02 |
| | | | 705/26.61 |
| 2014/0058768 A1* | 2/2014 | Moxley | G06Q 10/02 |
| | | | 705/5 |
| 2014/0081715 A1* | 3/2014 | Govindaraman | G06Q 10/06398 |
| | | | 705/7.42 |
| 2014/0215573 A1* | 7/2014 | Cepuran | G06F 21/31 |
| | | | 726/4 |
| 2015/0135094 A1* | 5/2015 | Donneau-Golencer | H04L 12/1886 |
| | | | 715/752 |
| 2015/0178690 A1 | 6/2015 | May et al. | |
| 2015/0186369 A1* | 7/2015 | Yan | G06F 17/30268 |
| | | | 715/201 |
| 2015/0248649 A1* | 9/2015 | Avats | G06Q 10/1053 |
| | | | 705/321 |
| 2015/0278212 A1* | 10/2015 | Krueppel-Berndt | G06F 16/951 |
| | | | 707/728 |
| 2015/0278718 A1* | 10/2015 | Evans | G06Q 10/063 |
| | | | 705/7.11 |
| 2016/0224939 A1* | 8/2016 | Chen | G06Q 10/107 |
| 2016/0345132 A1* | 11/2016 | Creighton | H04W 4/029 |
| 2016/0350307 A1* | 12/2016 | VerWeyst | G06F 21/6227 |

OTHER PUBLICATIONS

S.M.F.D, Syed Mustapha (2011) Context-based Integrated Suites for News Delivery System. Journal of Ubiquitous Systems & Pervasive Networks, 2 (1). pp. 23-30 (Year: 2011).*

Non-Final Office Action from U.S. Appl. No. 14/842,697, dated Jan. 4, 2018.

Final Office Action from U.S. Appl. No. 14/842,697, dated Aug. 16, 2018.

Advisory Action from U.S. Appl. No. 14/842,697, dated Nov. 19, 2018.

Hu et al., U.S. Appl. No. 14/842,697, filed Sep. 1, 2015.

Non-Final Office Action from U.S. Appl. No. 14/842,697, dated Jan. 30, 2019.

Final Office Action from U.S. Appl. No. 14/842,697, dated Jul. 19, 2019.

Notice of Allowance from U.S. Appl. No. 14/842,697, dated Aug. 24, 2020.

Non-Final Office Action from U.S. Appl. No. 14/842,697, dated Jan. 16, 2020.

* cited by examiner

WORK RELATED FEEDBACK SYSTEM, METHOD, AND COMPUTER PROGRAM PRODUCT

FIELD OF THE INVENTION

The present invention relates to computer applications utilized for performance review.

BACKGROUND

Conventionally, a top-down approach has been taken for performance review, particularly within a workplace. This has limited performance reviews to being given solely by superiors to the employees under their management. Thus, while computer applications have been developed to aid in the performance review process, the process has still been inhibited due to the traditional top-down approach. In particular, these computer applications have not generally allowed individuals having work-based relationships (e.g. peers within a workplace) to exchange feedback with one another.

There is thus a need for addressing these and/or other issues associated with the prior art.

SUMMARY

A work related feedback system, method, and computer program product are provided. In use, a system is made accessible to a user via a network, where the system has memory and at least one processor. Further, individuals having a work-based relationship with the user are determined, by the system. The user is then allowed, by the system, to provide feedback for the individuals.

DETAILED DESCRIPTION

Figure 1:
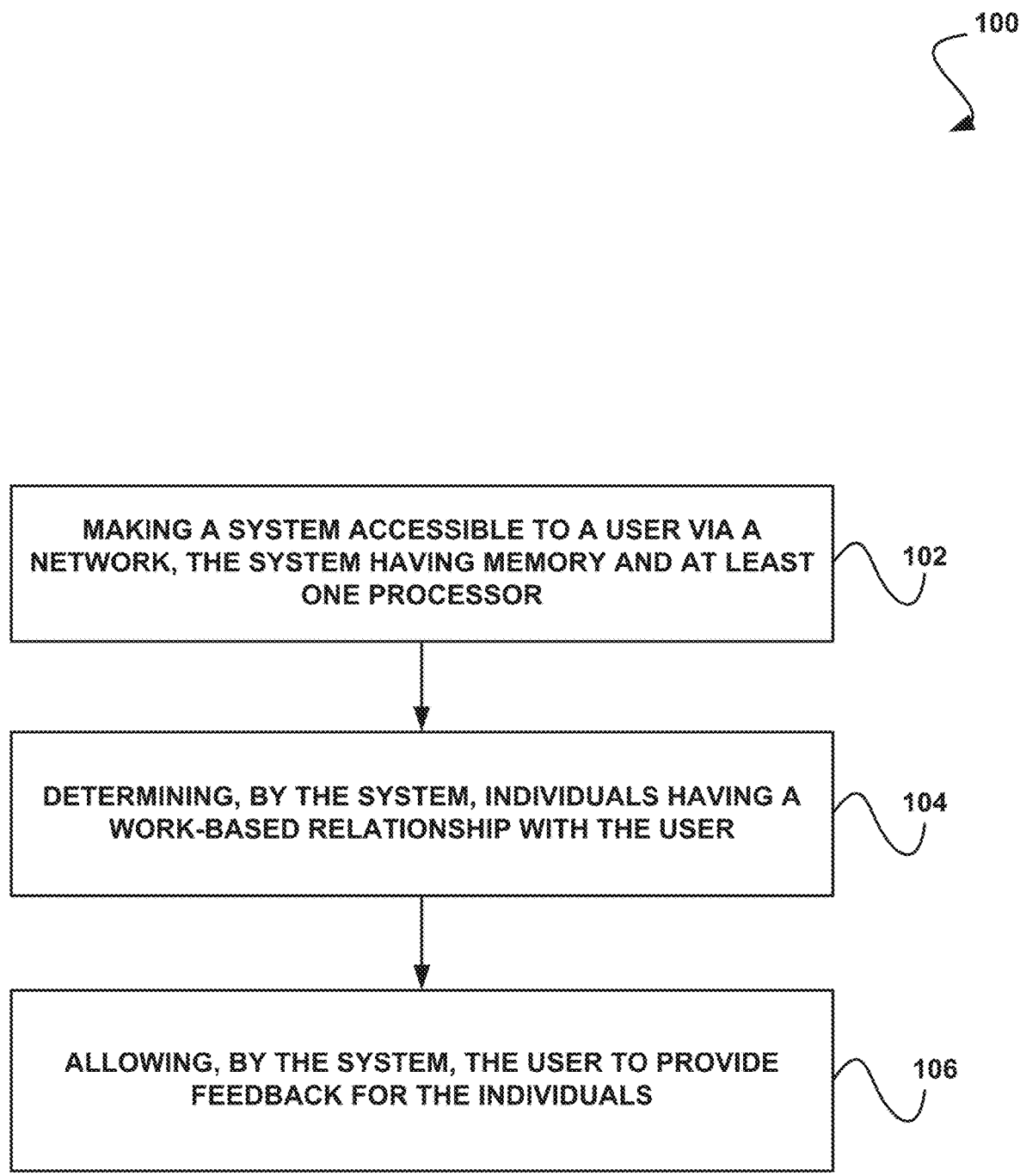
FIG. 1 illustrates a method for allowing a user to provide feedback for individuals with which the user has a work-based relationship, in accordance with one embodiment.

FIG. 1 illustrates a method 100 for allowing a user to provide feedback for individuals with which the user has a work-based relationship, in accordance with one embodiment. As shown in operation 102, a system is made accessible to a user via a network, where the system has memory and at least one processor. In various embodiments, the system may include one or more servers, general purpose computers, etc. Further, the network may be the Internet, a local area network (LAN), WiFi, etc.

As noted above, the system is made accessible to a user via the network. To this end, the user may utilize a computing device in order to access the system over the network. The computing device may be a desktop, mobile device, or any other network connected device capable of being operated by the user to receive input and provide output. Further, the user may have an account with the system (e.g. based on a registration by the user with the system), where the system stores profile information for the user within the account. This may involve downloading an application to the device of the user for use in accessing the system. As another option, the user may not necessarily be required to have an account with the system in order to access the system.

As an option, the system may be made accessible to the user by the system providing one or more graphical user interfaces (GUIs) to the device of the user. These GUIs may be displayed within a browser of the user's device, and may provide various features of the system (e.g. as described in more detail below). It should be noted that while the method 100 is described in the context of a single user accessing the system, it should be noted that the system may be made accessible to any number of different users in accordance with the described method 100.

In operation 104, individuals having a work-based relationship with the user are determined, by the system. It should be noted that with respect to at least some of the subsequently described figures, the individuals may also be referred to as peers (i.e. of the user within a work environment). In the context of the present description, the work environment may exist within physical buildings, over a network, or a combination of the same. The work environment may further encompass a single business entity (e.g. company), such that the peers of the user are co-workers of the user with the single company. As another option, the work environment may encompass multiple business entities, such that the peers of the user are not necessarily within a same business entity as the user but nevertheless have the work-based relationship with the user.

The individuals having the work-based relationship with the user may be determined in any desired manner. In one embodiment, the user may input to the system an indication of the individuals (e.g. by name, email address, or any other identification) such that the system determines the individuals from the input. Of course, the system may also determine the individuals from input received from an administrator or any other person.

In another embodiment, the system may automatically determine the individuals, such as from information relating to the user and capable of being retrieved by the system through the network or through any other network. For example, the system may identify one or more of the user's accounts with other online services, and may then retrieve identifiers of persons from those accounts. The accounts may be for email, calendar, social networks, etc. The identified persons may be contacts of the user included in the user's account(s), senders or receivers of email messages to/from the user via the user's account(s), participants in events (e.g. calendar events) saved within the user's account(s), persons mentioned in a post within the user's account(s), etc.

Moreover, the system may then determine whether each of the identified persons is an individual having a work-based relationship with the user. This may be accomplished by analyzing a context in which the person was identified by the system, such as content of an email message, calendar event, post, etc. from which the person was identified. Of course, while various examples are given above, it should be noted that the system may automatically determine the aforementioned individuals in any desired manner, and at any desired time. For example, the system may automatically determine the individuals at a scheduled interval (e.g. periodically), such as to periodically refresh the individuals identified for the user (e.g. from more recently retrieved information). As another example, the system may automatically determine the individuals on demand, such as when the user accesses (e.g. logs into) the system.

Then, in operation 106, the user is allowed, by the system, to provide feedback for the individuals. This may be accomplished by the system providing the aforementioned GUIs to the device of the user. Examples of these GUIs will be described in more detail below with reference to subsequent figures, but in any case at least some of the GUIs may allow the user to provide feedback for the individuals. The user may then utilize the system to provide the feedback for one or more of the individuals.

As an option, the user may be allowed to provide the feedback for the individuals proactively. For example, the user my access one of the GUIs for providing the feedback, and in response the system may proactively select one or more of the individuals for allowing the user to give feedback therefore. As another option, the user may be allowed to provide the feedback for the individuals that have requested such feedback. For example, the individuals may access one of the GUIs for requesting feedback either in general, or specifically from the user.

In the context of the present description, the feedback for an individual may be any information describing the individual with respect to the work environment. In other words, the feedback may be work related. Just by way of example, the feedback may relate to behavior of the individual within the work environment, productivity of the individual within the work environment, etc. Furthermore, it may primarily be the case that the feedback is made accessible to the individual anonymously, such that the system may not necessarily inform the individual that the feedback was provided by any specific user. Of course, the anonymous nature of the feedback may optionally be dependent on various predefined criteria, such as for example whether the user has authorized disclosure of the user's identity when making the feedback accessible to the individual, etc.

Accordingly, the feedback provided by the user may be made accessible to the respective individuals having the work-based relationship with the user, by the system. Making the feedback accessible may include, in some embodiment, the system automatically (e.g. proactively) communicating the feedback to the respective individuals (e.g. by email, system alert, or other desired type of notification). In the embodiments involving the automatic communication of feedback, the system may automatically communicate the feedback responsive to preconfigured triggers (e.g. defined by the individuals), at periodic intervals, etc. In other embodiments, making the feedback accessible may include the system communicating the feedback to the respective individuals on demand (e.g. responsive to a request for such feedback being made by the individuals). In the embodiments involving the on demand communication of feedback, the individuals may utilize the GUIs of the system to request the feedback.

As an option, the feedback may be made accessible to the individuals for a predefined period of time. For example, the feedback may be made accessible for the predefined period of time and then refreshed such that only newly received feedback from the user for newly identified individuals is made accessible to those respective individuals. Of course, the system may store the feedback for a longer period of time than the feedback is made accessible to the individuals.

As a further option, when one of the individuals does not have an account with the system and the user provides feedback for the one of the individuals, the system may be automatically prompted to send an electronic message to that individual inviting the individual to create an account with the system. The account may make the system accessible to the individual for viewing the feedback, and may involve downloading an application to the device of the individual for use in accessing the system. Thus, the respective feedback may be made accessible to each of the individuals, by the system, when the individual has an account with the system. Of course, when the user is not required to have an account with the system to provide the feedback, the individuals may also not necessarily be required to have an account with the system to access the feedback.

It should be noted that the system may also similarly operate for the individuals having the work-based relationship with the user to provide feedback for the user. In other words, the system may allow the user to receive feedback provided by one or more of the individuals. In this way, users having a work-based relationship with one another may utilize the system to reciprocate providing feedback for one another.

To this end, a system is provided which may perform the method 100 of FIG. 1 (e.g. through computer code embodied on a non-transitory computer readable medium) enabling a user to provide feedback for individuals with which the user has a work-based relationship. As noted above, this may allow individuals to provide feedback for one another.

Moreover, the method 100 may performed with respect to any user, such that the system does not necessarily require that the user giving the feedback be a supervisor, or otherwise a superior, to the individual within a workplace.

In the context of the method 100 of FIG. 1, a work related feedback specific application or otherwise a general browser, in communication with the remote system, may reside on the device of the user for allowing the user to provide the work related feedback. From the perspective of the device of the user, input identifying the user may be received by the device of the user (e.g. login or other identifying information) and the input may be communicated to the system. After communicating the input, an indication of individuals having a work-based relationship with the user is received, and the user is allowed to provide, through the device of the user, feedback for the individuals.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
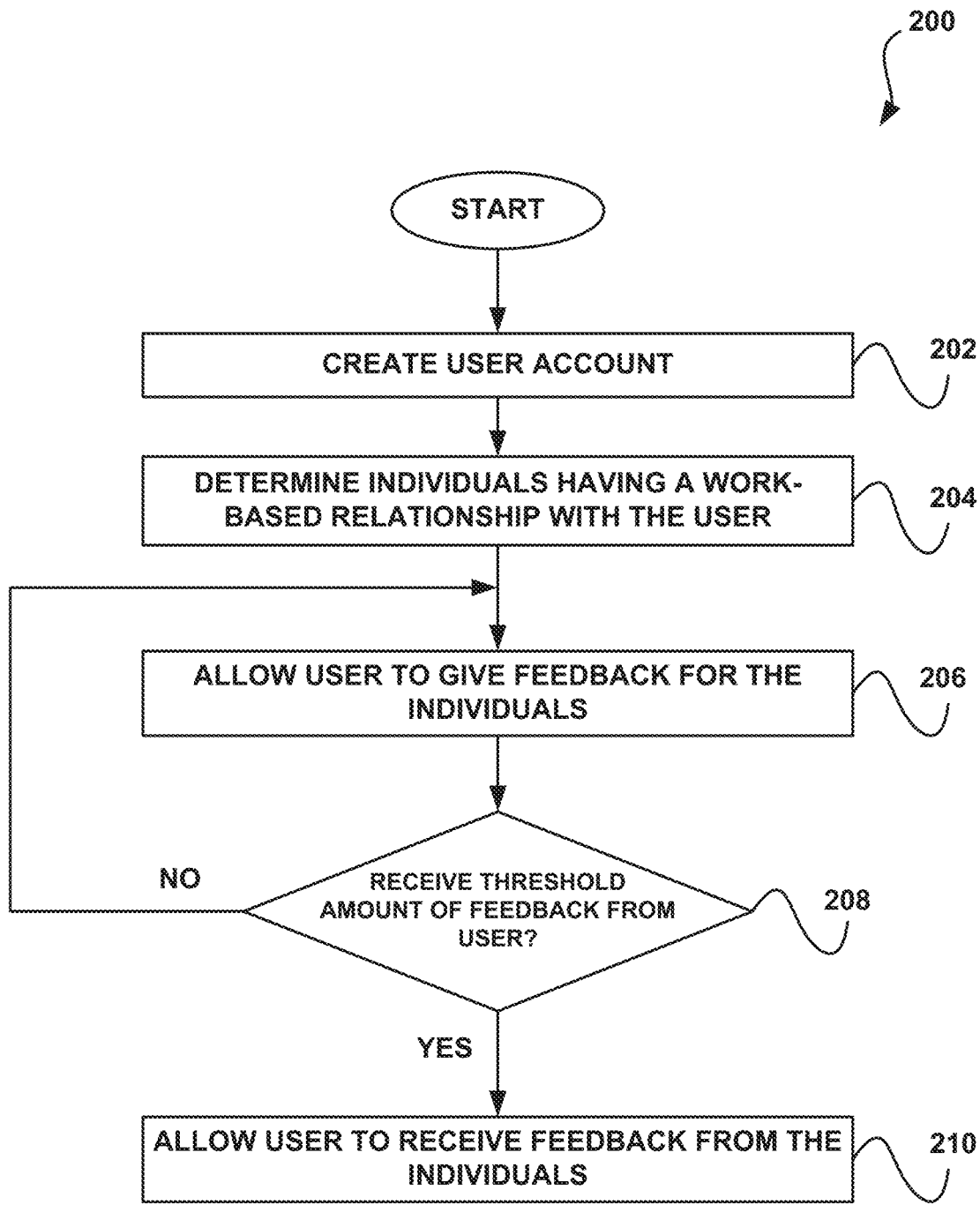
FIG. 2 illustrates a method for allowing a user to receive work related feedback, in accordance with another embodiment.

FIG. 2 illustrates a method 200 for allowing a user to receive work related feedback, in accordance with another embodiment. As an option, method 200 may be carried out by a system in the context of the details of FIG. 1. Of course, however, method 200 may be carried out in the context of any desired environment. Further, the aforementioned definitions may equally apply to the description below.

As shown in operation 202, a user account is created. The user account may be created by a user accessing the system and providing input to the system to create the account for the user. For example, when the user is provided a GUI to create an account, the user may enter an email address into the GUI, and subsequent GUIs may be provided for allowing the user to create the account.

Individuals having a work-based relationship with the user are then determined, as shown in operation 204. The individuals may be determined using information provided by the user to the system when creating the account. For example, the information provided by the user may indicate the individuals, or may indicate other accounts of the user, such as an email account, social media account, etc. from which the system may automatically determine the individuals.

Once the individuals of the user are determined, the user is allowed to give feedback for the individuals, as shown in operation 206. The user may selectively choose the individuals and give feedback for those selected individuals, in one embodiment. The user may also selectively choose types of feedback to give for the individuals, for example by accessing certain GUIs specific to certain types of feedback. The types of feedback may relate to performance, career path, relationships, impressions, etc. as described in more detail with reference to some of the subsequent figures below.

After the user is allowed to give feedback for the individuals, it is determined in decision 208 whether a threshold amount of feedback has been received from the user. The threshold may be preconfigured in any desired manner. For example, the threshold may relate to a number of the individuals for which the user has given feedback, a number of questions answered by the user for giving the feedback, a number of GUIs requesting input on feedback that have been completed by the user, a series of GUIs requesting input on a particular peer or a particular category of feedback are completed, etc. In certain instances, as desired, the threshold may be configured to zero, i.e., no threshold amount of feedback would be required for the user to receive feedback previously given for the user, which is otherwise described below.

This decision 208 may be made at any desired time, such as after the user completes a series of GUIs mentioned above, or provides any other specified portion of feedback. When it is determined that the threshold amount of feedback has been received from the user, the user is allowed to receive feedback previously given for the user (e.g. by the individuals or any other individuals previously determined to have a work-based relationship with the user), as shown in operation 210. On the other hand, when it is determined that the threshold amount of feedback has not been received from the user, the user is not allowed to receive the feedback previously given for the user. In this way, in accordance with the present method 200, work-based feedback given for a user may only be made available to the user once the user has given a threshold (or if required, more than the threshold) amount of work-based feedback for the user's peers (i.e. individuals having a work-based relationship with the user). This method 200 may incentivize the user to give the feedback for the user's peers.

Figure 3:
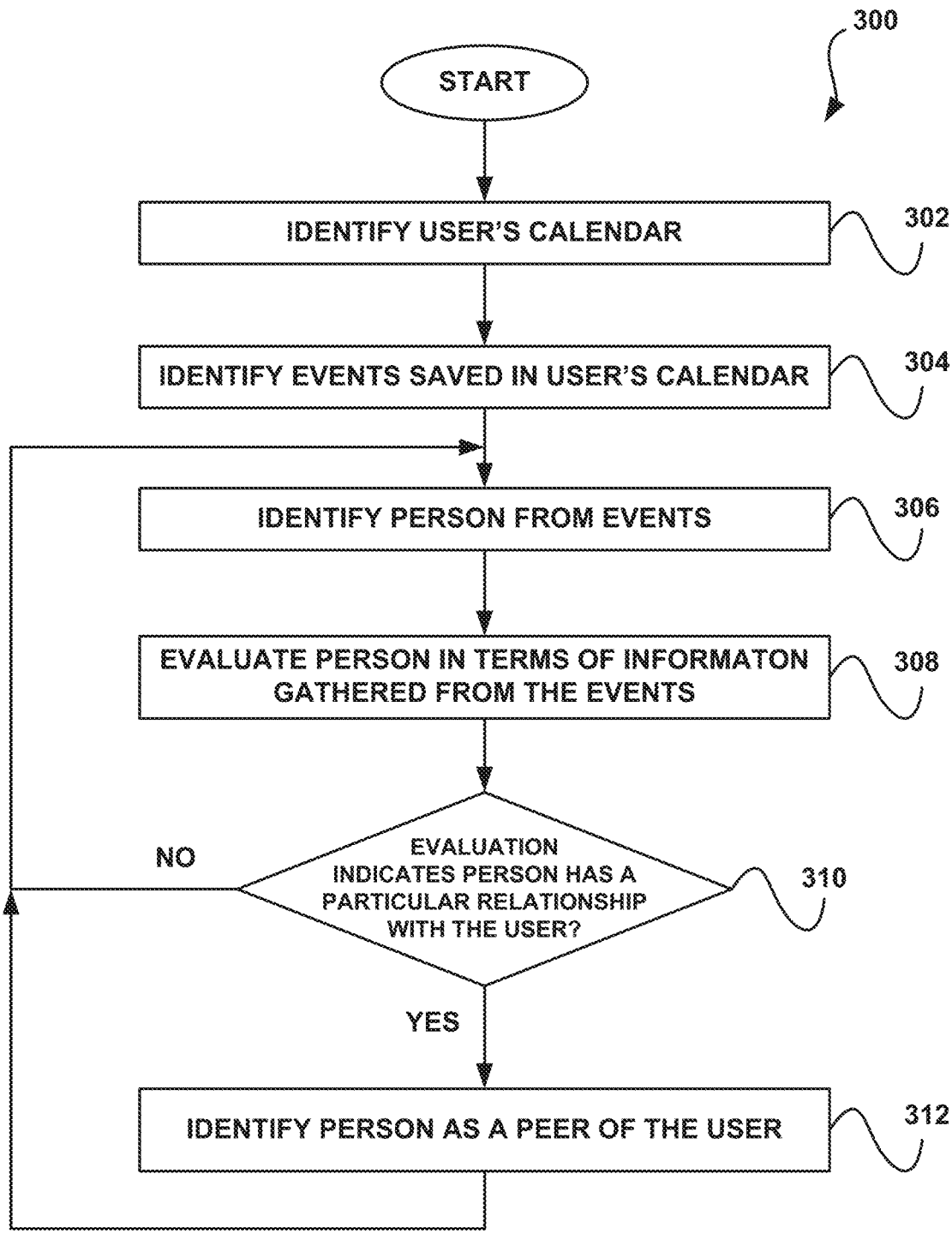
FIG. 3 illustrates a method for determining individuals with which a user has a particular relationship utilizing a calendar of the user, in accordance with yet another embodiment.

FIG. 3 illustrates a method 300 for determining individuals with which a user has a particular relationship utilizing a calendar of the user, in accordance with yet another embodiment. As an option, method 300 may be carried out by a system in the context of the details of FIGS. 1-2. For example, the method 300 may be carried out in the context of operation 204 of FIG. 2 to determine individuals having a work-based relationship with the user. Of course, however, method 300 may be carried out in the context of any desired environment. For example, while the method 300 is primarily described below with reference to determining individuals with which the user has a work-based relationship, it should be noted that the method 300 may be similarly implemented for determining individuals having any particular type of relationship with the user. Again, the aforementioned definitions may equally apply to the description below.

As shown in operation 302, a user's calendar is identified. In the context of the present description, the calendar is electronic and may be stored in memory of the device of the user and made accessible through an application installed on the device of the user, or may be stored in memory of an external system providing the calendar to the user via a network.

Further, the user's calendar may be identified from input provided by the user to the system. For example, the input may identify a link to the user's calendar, an account (external to the system) having the user's calendar, etc. The input may optionally be provided by the user during registration of the user with the system.

Next, in operation 304, events saved in the user's calendar are identified. The events that are identified may be those that are determined to be associated with the particular relationship. In one embodiment where the method 300 is for identifying individuals having a work-based relationship with the user, only events identified by the system as work related may be identified. The system may determine the work related events from all events saved in the user's calendar based on the user marking those events with a work related category indicator (e.g. a meeting, etc.). As another example, the system may determine the work related events from all events saved in the user's calendar using information included in the saved events (e.g. a description, subject, location, etc.). Where the method 300 is for identifying individuals with another type of relationship with the user, then events saved to the user's calendar that are predetermined as being specific to that relationship type may be identified. Optionally, only events within a particular time period on the user's calendar may be identified, such as a past quarter, month, etc.

In operation 306, a person is identified from the events identified in operation 304. The person may be a participant of (e.g. an invitee to or an organizer of) one of the events. In any case, identification information for the person is determined from the saved events. The identification information of the person may be a name for the person, an email address for the person, etc.

Further, in operation 308, the person is evaluated in terms of information gathered from the events. In one particular embodiment, the person is evaluated to determine whether the person is an individual having a work-based relationship with the user (i.e. a peer within a work environment). As noted above, however, the person may be evaluated to determine whether the person has any other particular type of relationship with the user. The information gathered from the events may be specific to the events from which the person was identified.

In one embodiment, information gathered from the events may be values for predefined parameters. The predefined parameters may be indicative that the person should be determined as the aforementioned peer of the user. Just by way of example, the gathered information may include a frequency of the events from which the person was identified. This may include a number of events saved to a predefined time period (e.g. a week, month, quarter, etc.) on the calendar. As other examples, the gathered information may include a number of persons identifiable from each of the events from which the person was identified, an indication of how long ago each of the events passed, or any other information indicating a relevancy of the event and/or person to the user (and optionally the work environment of the user).

Further, the values determined for those predefined parameters may be combined, weighted, and/or evaluated in any manner to determine whether the person is an individual having a desired relationship with the user. Just by way of example, the evaluation of the person may result in a value indicating a particular strength of relationship the person has with the user, and if the strength meets a particular threshold strength then the person may be determined to have the particular relationship with the user.

In this way, peers of the user (i.e. those having the particular type of relationship) may be determined automatically using events saved to the calendar of the user. Of course, it should be noted that any additional information, which may be separate from the calendar of the user (e.g. information from other accounts of the user such as email, etc.), may also similarly be used to enhance the evaluation of the person.

It is then determined in decision 310 whether the evaluation indicates that the person is an individual having a particular relationship with the user. When it is determined from the evaluation that the person is not indicated (e.g. by the calendar) to be an individual having the particular relationship with the user, the method 300 returns to operation 306 in which another person is identified from the events identified in operation 304. This other person may then be evaluated, as described with respect to operation 308 above.

However, when it is determined from the evaluation that the person is indicated to be an individual having the particular relationship with the user, the person is identified as a peer (i.e. work-related or otherwise) of the user, as shown in operation 312. The user may then be allowed to give feedback for the peer, for example as described with respect to operation 206 of FIG. 2 above. The method 300 then returns to operation 306 in which another person is identified from the events identified in operation 304. This other person may then be evaluated, as described with respect to operation 308 above. To this end, the method 300 may allow each person identified from the events on the user's calendar to be evaluated for determining whether that person is a peer of the user. The system may then perform one or more actions in relation to the peers determined for the user, such as allowing the user to provide feedback for the peers.

Figure 4:
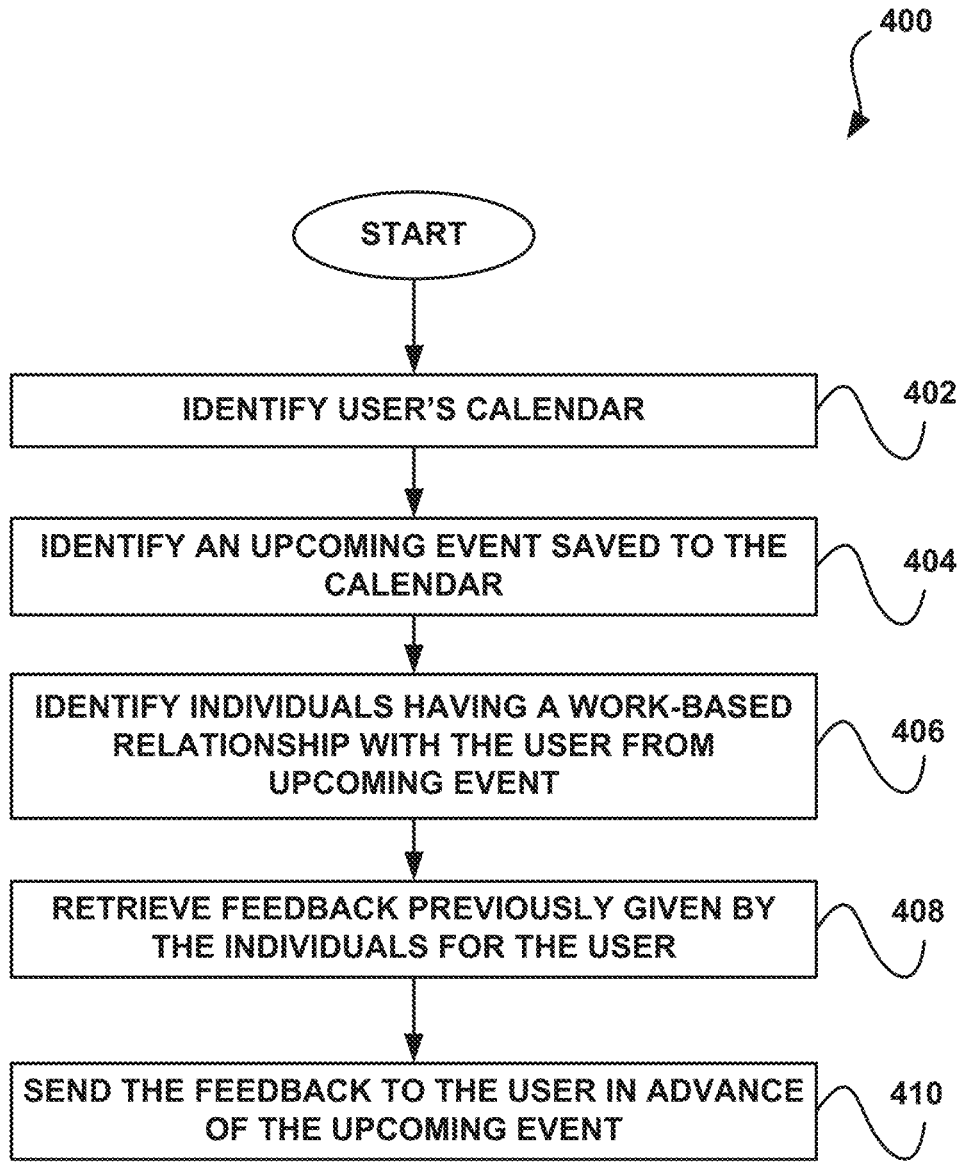
FIG. 4 illustrates a method for utilizing a user's calendar to send relevant work related feedback to the user in advance of an upcoming calendared event, in accordance with another embodiment.

FIG. 4 illustrates a method 400 for utilizing a user's calendar to send relevant work related feedback to the user in advance of an upcoming calendared event, in accordance with another embodiment. As an option, method 400 may be carried out by a system in the context of the details of FIGS. 1-2. For example, the method 400 may be carried out in the context of operation 210 of FIG. 2. Of course, however, method 400 may be carried out in the context of any desired environment. Again, the aforementioned definitions may equally apply to the description below.

As shown in operation 402, a user's calendar is identified. This operation 402 may be performed as described above with reference to operation 302 of FIG. 3. In the present embodiment, operation 402 may be performed periodically for the purpose of sending relevant work related feedback to the user in advance of an upcoming calendared event, as described below. Thus, the operation 402 may be performed automatically (e.g. without any effort by the user beyond selection by the user of an option to opt-in to receiving work related feedback in advance of scheduled meetings).

After identifying the user's calendar, an upcoming event saved to the user's calendar is identified, as shown in operation 404. For example, any event on the user's calendar that is to occur within a particular time period (e.g. a week, etc.) may be identified. In the present embodiment, the identified event may be one that is determined to be work related.

Individuals having a work-based relationship with the user (i.e. peers of the user within a work environment) are then identified from the upcoming event, as shown in operation 406. The peers may be persons that are participants of (e.g. invitees to or the coordinator of) the upcoming event. Thus, the peers may be a subset of all peers that have been previously identified for the user. Next, as shown in operation 408, feedback that has previously given by the peers for the user and that is relevant to the upcoming event is retrieved. Such relevancy may be determined as a result of the peer being a participant to the meeting.

The feedback is then sent to the user in advance of the upcoming event, as shown in operation 410. In this way, the user may receive the feedback given by the user's peers for review before the upcoming event. This may allow the user to make an effort to improve behavior, etc. during the event as suggested by the user's peers.

Figure 5:
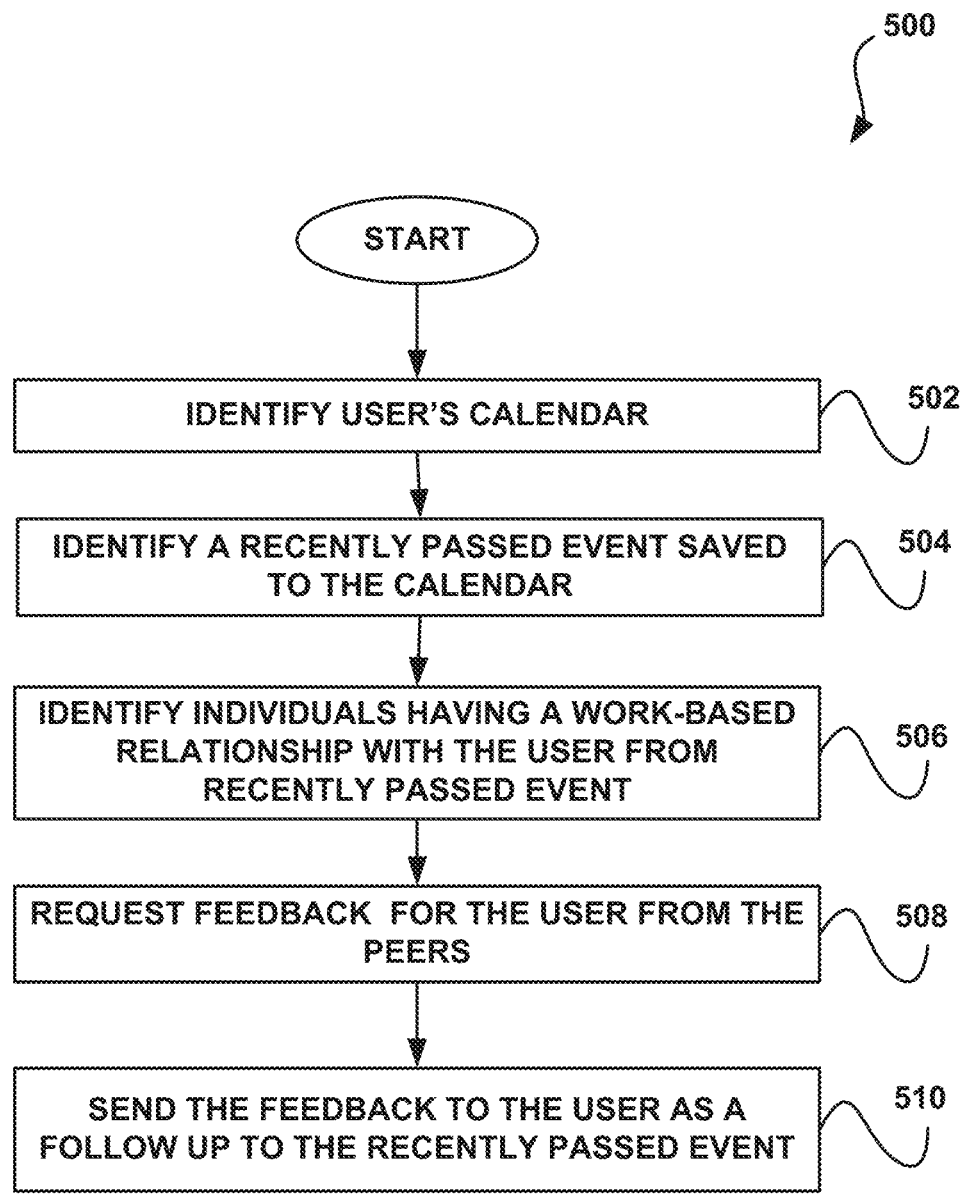
FIG. 5 illustrates a method for utilizing a user's calendar to send relevant work related feedback to the user as a follow up to a recently passed event, in accordance with still yet another embodiment.

FIG. 5 illustrates a method 500 for utilizing a user's calendar to send relevant work related feedback to the user as a follow up to a recently passed event, in accordance with still yet another embodiment. As an option, method 500 may be carried out by a system in the context of the details of FIGS. 1-2. For example, the method 500 may be carried out in the context of operation 210 of FIG. 2. Furthermore, the method 500 may be carried out subsequent to the method 400 described above in FIG. 4. Of course, however, method 500 may be carried out in the context of any desired environment. Again, the aforementioned definitions may equally apply to the description below.

As shown in operation 502, a user's calendar is identified. This operation 502 may be performed as described above with reference to operation 302 of FIG. 3. In the present embodiment, operation 502 may be performed periodically for the purpose of sending relevant work related feedback to the user as a follow up to a recently passed event, as described below.

After identifying the user's calendar, a recently passed event saved to the user's calendar is identified, as shown in operation 504. For example, any event on the user's calendar that passed within a particular time period (e.g. a week, etc.) may be identified. In the present embodiment, the identified event may be one that is determined to be work related.

Individuals having a work-based relationship with the user (i.e. peers of the user within a work-environment) are then identified from the recently passed event, as shown in operation 506. The peers may be persons that are participants of (e.g. invitees to or the coordinator of) the recently passed event. Thus, the peers may be a subset of all peers that have been previously identified for the user. Next, as shown in operation 508, feedback for the user is requested from the peers. For example, the peers may be sent any type of message for requesting the feedback. As an option, the feedback may be requested in a manner that specifically references the recently passed event, such that the peers are requested to give feedback in terms of the user's behavior, etc. during the recently passed event.

The feedback given by the peers is then sent to the user in as a follow up to the upcoming event, as shown in operation 510. In this way, the user may receive the feedback given by the user's peers for review after the recently passed event.

FIGS. 6-27 illustrate various GUIs of a work related feedback system, as examples for implementing at least some of the methods of the system described above. Thus, the GUIs are set forth for illustrative purposes only and should not be construed as limiting in any manner. Furthermore, at least some of the GUIs described below are detailed with respect to only a single peer, but it should be noted that those GUIs may be provided to the user repeatedly for allowing the user to give work related feedback for numerous peers identified for the user.

Figure 6:
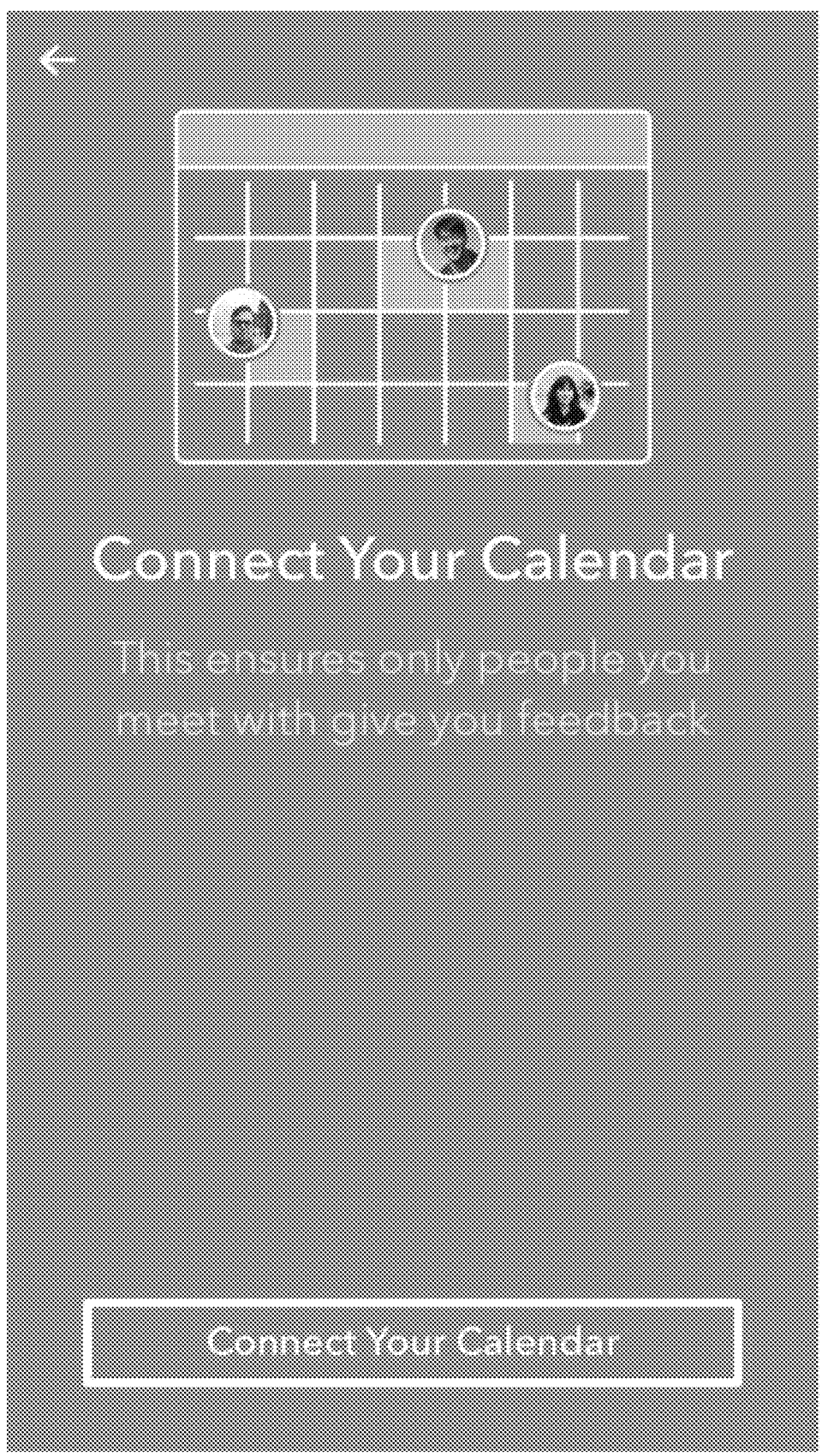
FIG. 6 illustrates a graphical user interface (GUI) for allowing a user to connect a calendar of a user to a work related feedback system, in accordance with another embodiment.

FIG. 6 illustrates a GUI for allowing a user to connect a calendar of a user to a work related feedback system, in accordance with an embodiment. The GUI may optionally be displayed during a registration of the user with the system, or during a setup of an account of the user with the system, and may specifically initiate a process allowing the user to connect a calendar. Connecting the calendar may include providing the system with information capable of being used by the system to read the user's calendar.

The calendar may be provided by another system external to the peer feedback system described above. For example, the work related feedback system and the calendar system may be provided by different service providers, and may communicate over a network (e.g. via application programming interfaces (APIs), etc.). In this case a pointer to the calendar may be provided by the user when the calendar is publicly viewable, or login information or other access information may be provided by the user when the calendar is private.

Figure 7:
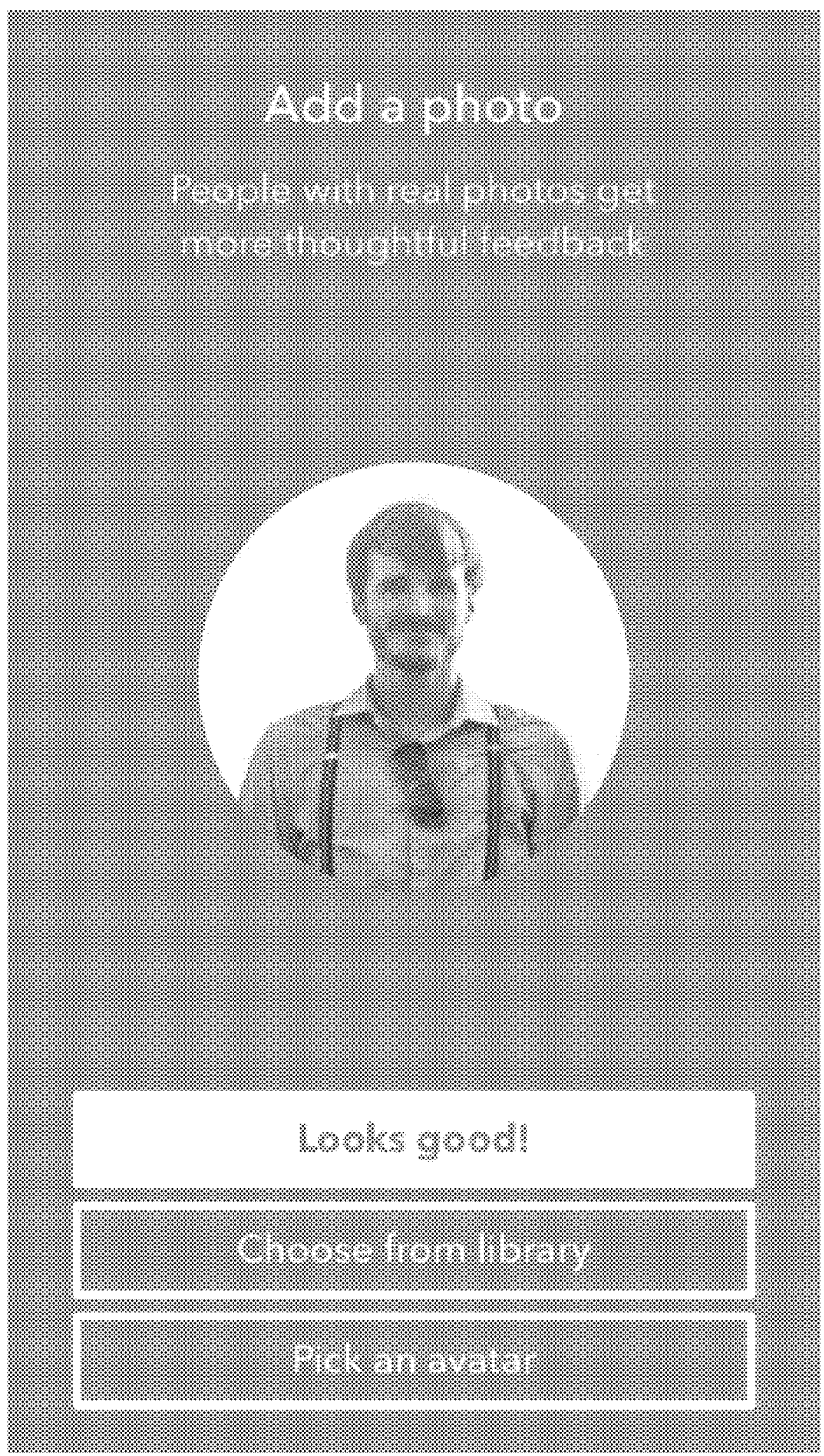
FIG. 7 illustrates a GUI allowing a user to customize an image representative of the user for an account of the user with a work related feedback system, in accordance with another embodiment.

FIG. 7 illustrates a GUI allowing a user to customize an image representative of the user for an account of the user with a work related feedback system, in accordance with an embodiment. The GUI may optionally be displayed during a registration of the user with the system, or during a setup of an account of the user with the system, and may specifically initiate a process allowing the user to indicate an image to be used by the system for representing the user.

For example, the user may upload a photo to the system (i.e. shown as "Choose from library"). As another example, the user may select from a plurality of icons predefined by the system (i.e. shown as "Pick an avatar"). As yet another option (now shown), potential images of the user may be retrieved from an Internet search (e.g. using Google™ and may be displayed to the user for selection thereof.

Absent the user's customization the system may randomly select one of the predefined icons to be used for the user and associated with the account of the user. As another option, the system may dynamically select one of the icons predefined by the system to represent the user, based on a peer that is to view the icon. Thus, the default icon used to represent the user may be different for the various peers of the user. This default icon may also be used with respect to an embodiment where a customization is not available, which may be desired to maintain anonymity as to the users of the system (e.g. where otherwise only user's would have the option for uploading photos).

The image may be used by the system when retrieving feedback for the user from the peers of the user, examples of which are described in more detail with reference to the subsequent GUIs described below. In other words, the image may be displayed within at least some of the subsequent GUIs described below.

Figure 8:
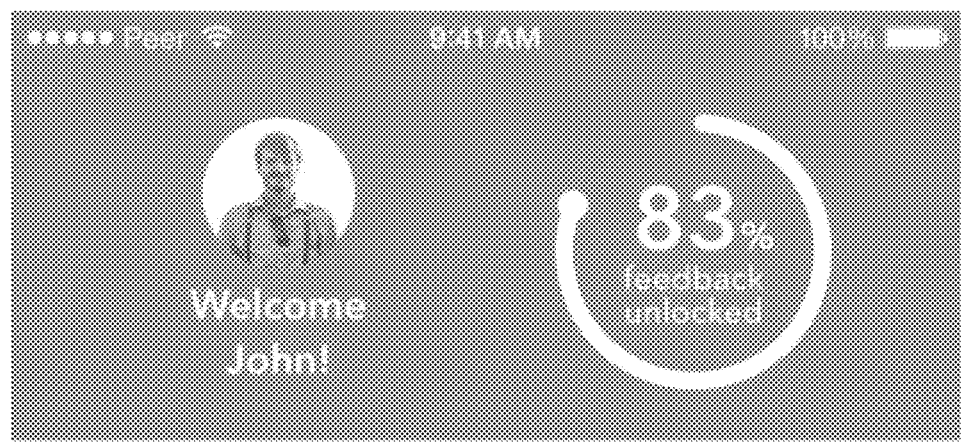
FIG. 8 illustrates a GUI allowing a user to select a category for giving work related feedback, in accordance with yet another embodiment.
Figure 8:
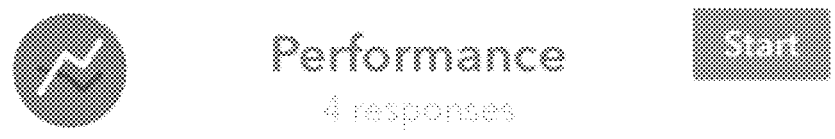
Figure 8:
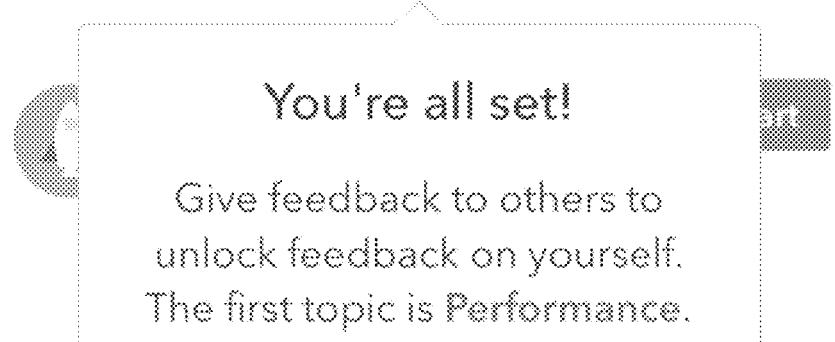
Figure 8:
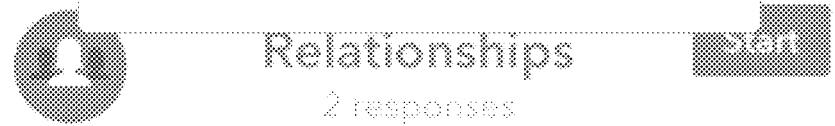
Figure 8:
Figure 8:
Figure 8:
Figure 8:
Figure 8:

FIG. 8 illustrates a GUI allowing a user to select a category for giving work related feedback, in accordance with an embodiment. As shown, the categories may be performance, relationships, impressions, etc., which are described in more detail with reference to the subsequent GUIs described below. After the user gives feedback for the user's peers, feedback already given for the user from those peers may be "unlocked", and thus made available to, the user. This feedback for the user may be made available to the user incrementally as the user gives feedback for the peers (i.e. shown as "83% feedback unlocked").

Figure 9:
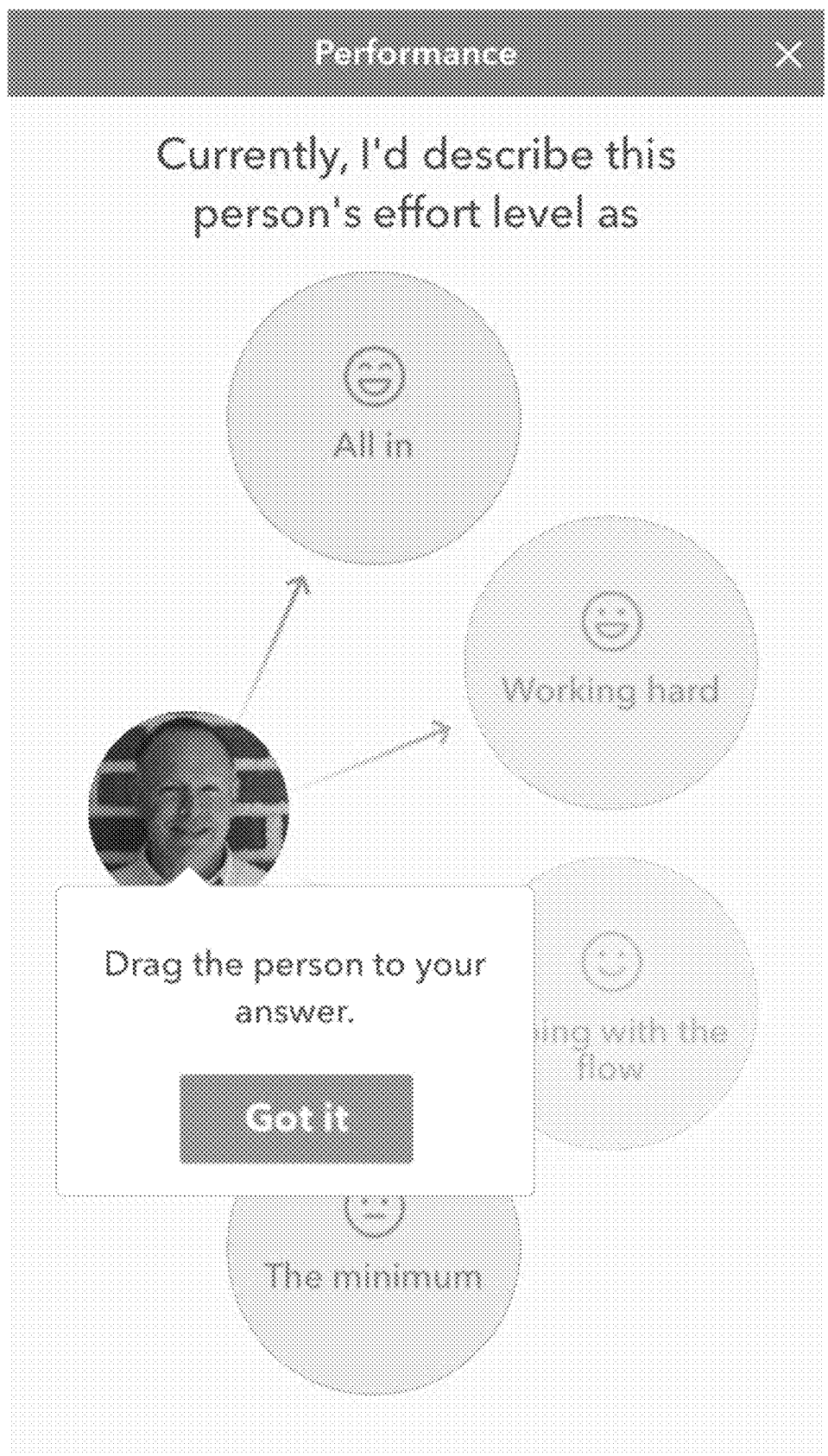
FIG. 9 illustrates a GUI allowing a user to give work related feedback for a peer within a performance category by allowing the user to move an image for the peer to one or more predetermined feedback values, in accordance with still yet another embodiment.

FIG. 9 illustrates a GUI allowing a user to give work related feedback for a peer within a performance category by allowing the user to move an image for the peer to one or more predetermined feedback values, in accordance with an embodiment. As an option, the GUI may be displayed in response to the user selecting the performance category displayed on the GUI of FIG. 8. As shown, an image for one of the peers of the user is provided in the GUI, and the user is allowed to interact with the image for providing the feedback for the peer. In the present GUI, a plurality of predetermined feedback values are also provided with the image of the peer, and the user is allowed to select one or more of the predetermined feedback values for providing the feedback for the peer by moving the image of the peer to the desired predetermined feedback values.

As another option, (not shown), one particular feedback value may be provided along with a plurality of peer images. The user may then give feedback for one or more of the peers by selecting the one or more of the peer images to indicate that the particular peer feedback value is applicable to the selected peers.

Figure 10:
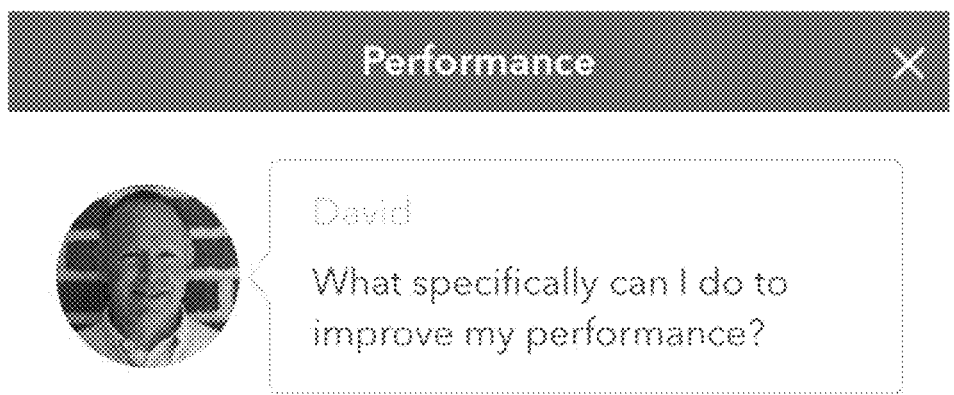
FIG. 10 illustrates a GUI allowing a user to enter text to give work related advice for a peer within a performance category, in accordance with another embodiment.
Figure 10:
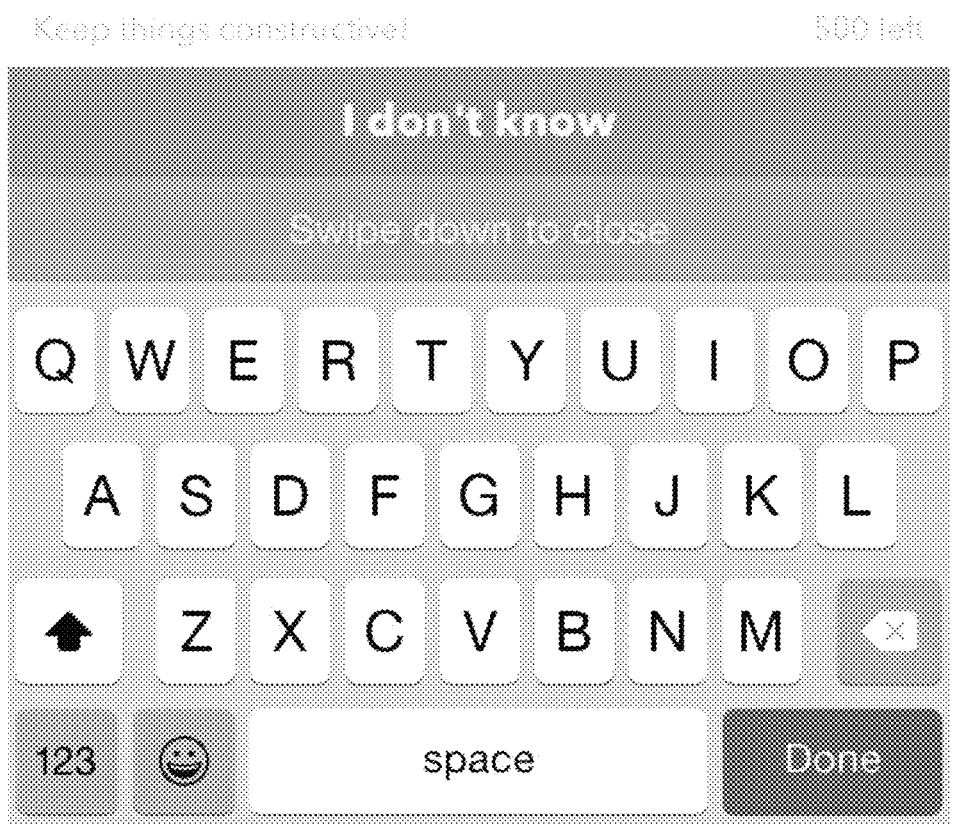

FIG. 10 illustrates a GUI allowing a user to enter text to give work related advice for a peer within a performance category, in accordance with another embodiment. As an option, the GUI may be provided to the user subsequent to the GUI of FIG. 9. For example, the GUI in FIG. 10 may allow the user to give follow up advice to the peer in the form of text for any of the predetermined feedback values selected for the peer in FIG. 9. It should be noted that GUIs similar to that shown in FIG. 10 may be provided with reference to the other GUIs allowing the user to provide feedback on other categories.

Figure 11:
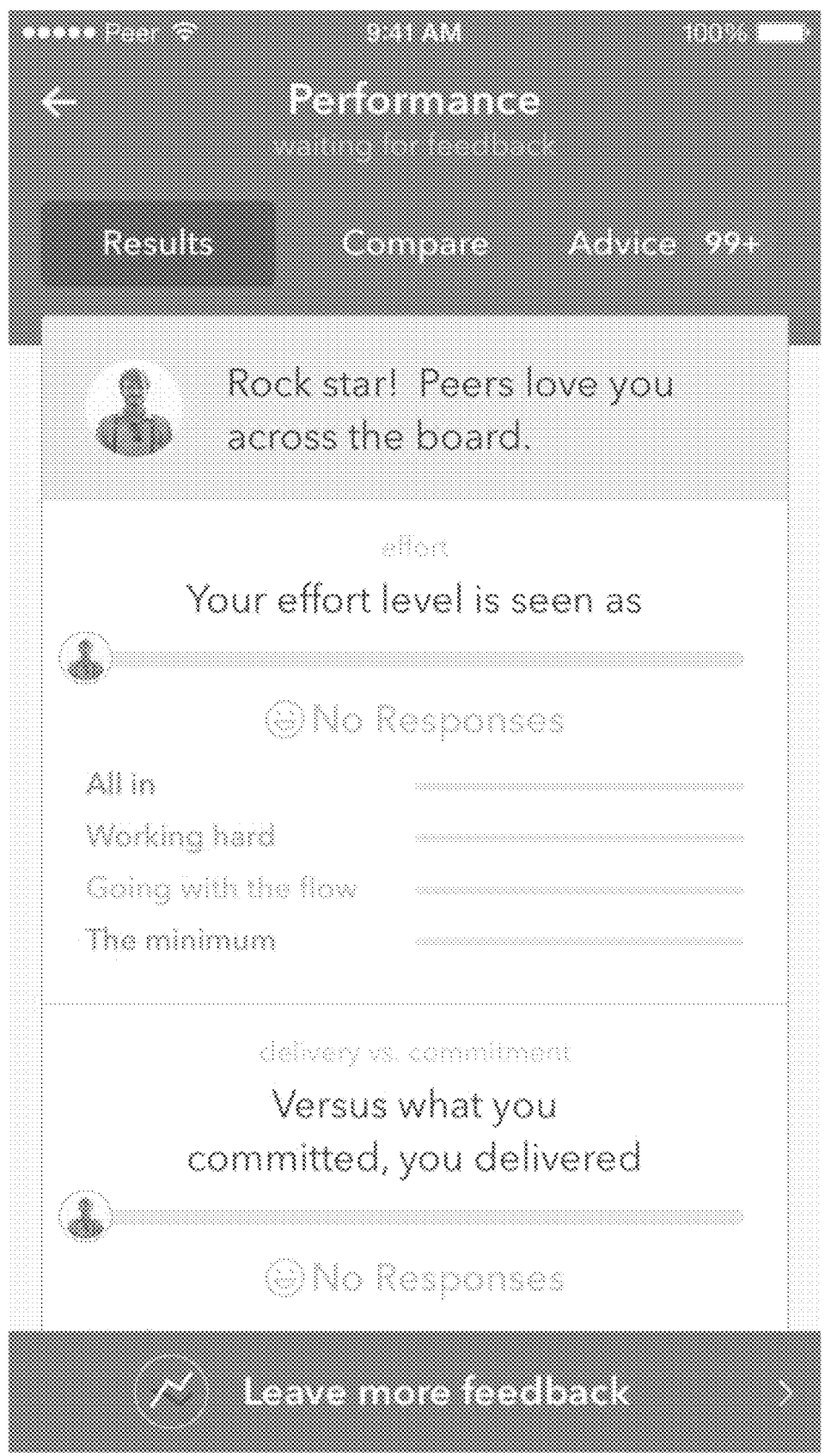
FIG. 11 illustrates a GUI allowing a user to receive work related feedback given for the user in the performance category, in accordance with another embodiment.

FIG. 11 illustrates a GUI allowing a user to receive work related feedback given for the user in the performance category, in accordance with an embodiment. For example, after the user has given a predefined threshold amount of feedback for the user's peers in the performance category, then the user may be allowed to receive feedback previously given for the user by the peers of the user (e.g. within the performance category). As an alternative, the user may first receive peer feedback given for the user, and then may be prompted to give feedback (e.g. in the same category as the received feedback).

Figure 12:
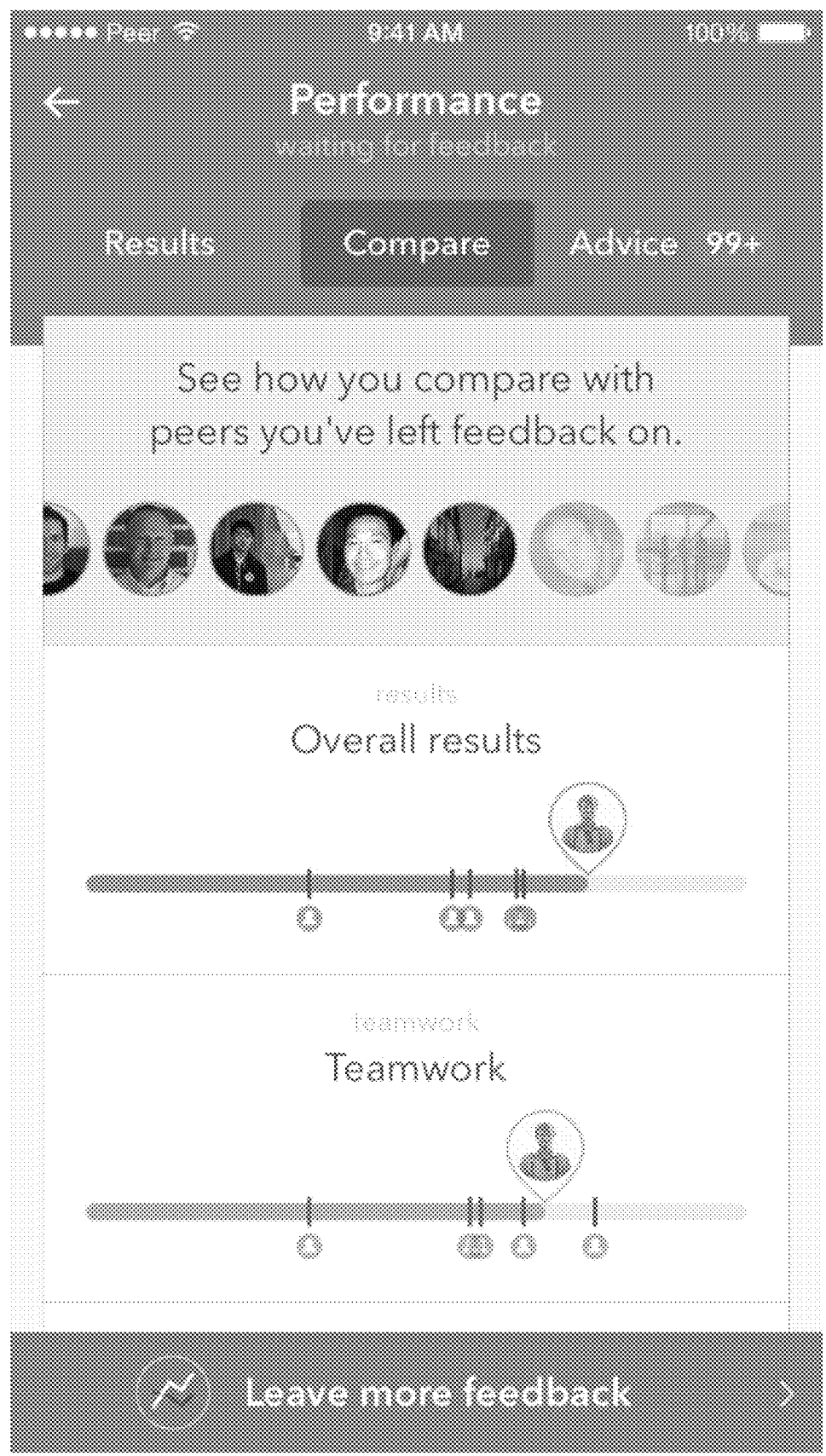
FIG. 12 illustrates a GUI allowing a user to receive a comparison of work related feedback provided for the user and work related feedback provided for peers of the user in the performance category, in accordance with yet another embodiment.

FIG. 12 illustrates a GUI allowing a user to receive a comparison of work related feedback provided for the user and work related feedback provided for peers of the user in the performance category, in accordance with an embodiment. Again, as an option, after the user has given a predefined threshold amount of feedback for the user's peers in the performance category, then the user may be allowed to view the GUI shown in FIG. 12.

Figure 13:
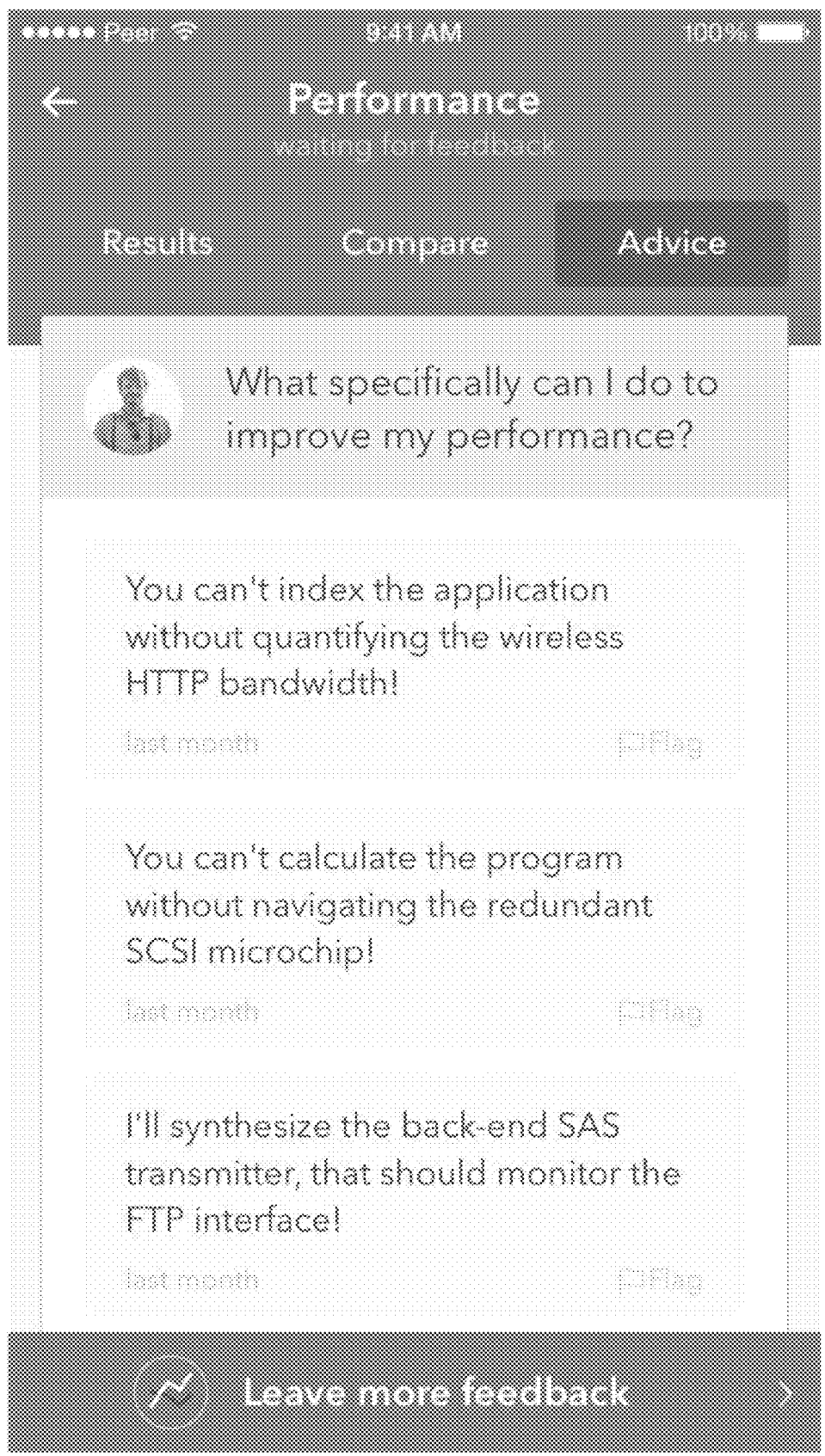
FIG. 13 illustrates a GUI allowing a user to receive work related advice given for the user in the performance category, in accordance with another embodiment.

FIG. 13 illustrates a GUI allowing a user to receive work related advice given for the user in the performance category, in accordance with an embodiment. The work related advice may be text entered by the user's peers, such as via the GUI described above with respect to FIG. 10. Yet again, the GUI of FIG. 13 may optionally only be available to the user after the user has given a predefined threshold amount of feedback for the user's peers in the performance category.

Figure 14:
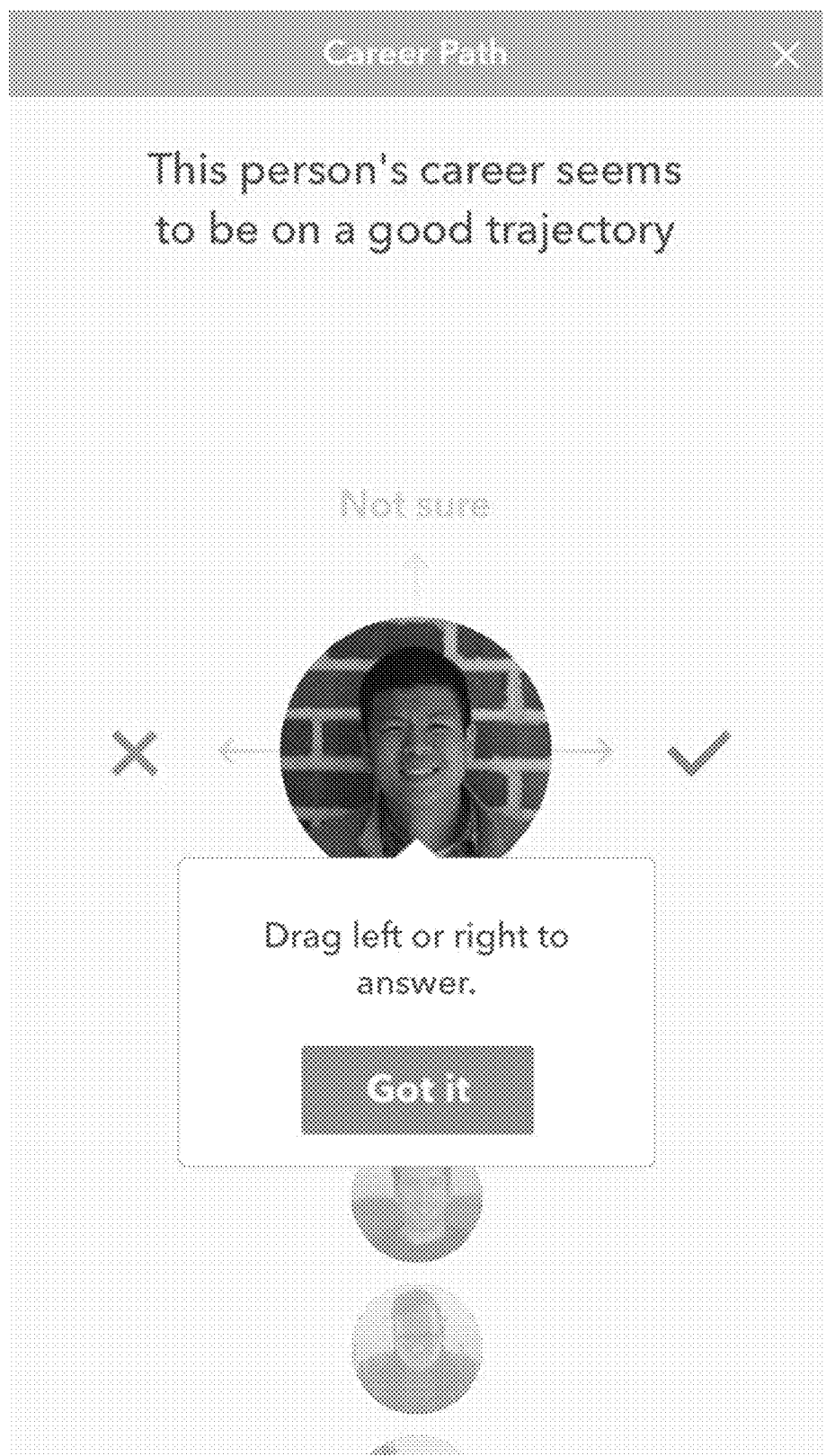
FIG. 14 illustrates a GUI allowing a user to give work related feedback for a peer within a career path category by allowing the user to move an image representing the peer to one of a plurality of displayed answers for a given question, in accordance with another embodiment.

FIG. 14 illustrates a GUI allowing a user to give work related feedback for a peer within a career path category by allowing the user to move an image representing the peer to one of a plurality of displayed answers for a given question, in accordance with another embodiment. As an option, the GUI may be displayed in response to the user selecting the performance category displayed on the GUI of FIG. 8. As shown, an image for one of the peers of the user is provided in the GUI, and the user is allowed to interact with the image for providing the feedback for the peer. In the present GUI, a statement indicative of a particular feedback is given, along with true/false or yes/no options, in association with the image of the peer, and the user is allowed to select one of the options responsive to the statement for providing the feedback for the peer (i.e. by moving the image of the peer to the desired option).

Figure 15:
FIG. 15 illustrates a GUI allowing a user to enter text to give work related advice for a peer within a career path category, in accordance with another embodiment.
Figure 15:

FIG. 15 illustrates a GUI allowing a user to enter text to give work related advice for a peer within a career path category, in accordance with an embodiment. As an option, the GUI may be provided to the user subsequent to the GUI of FIG. 14. For example, the GUI in FIG. 15 may allow the user to give follow up advice to the peer in the form of text for the option selected for the peer in FIG. 14.

Figure 16:
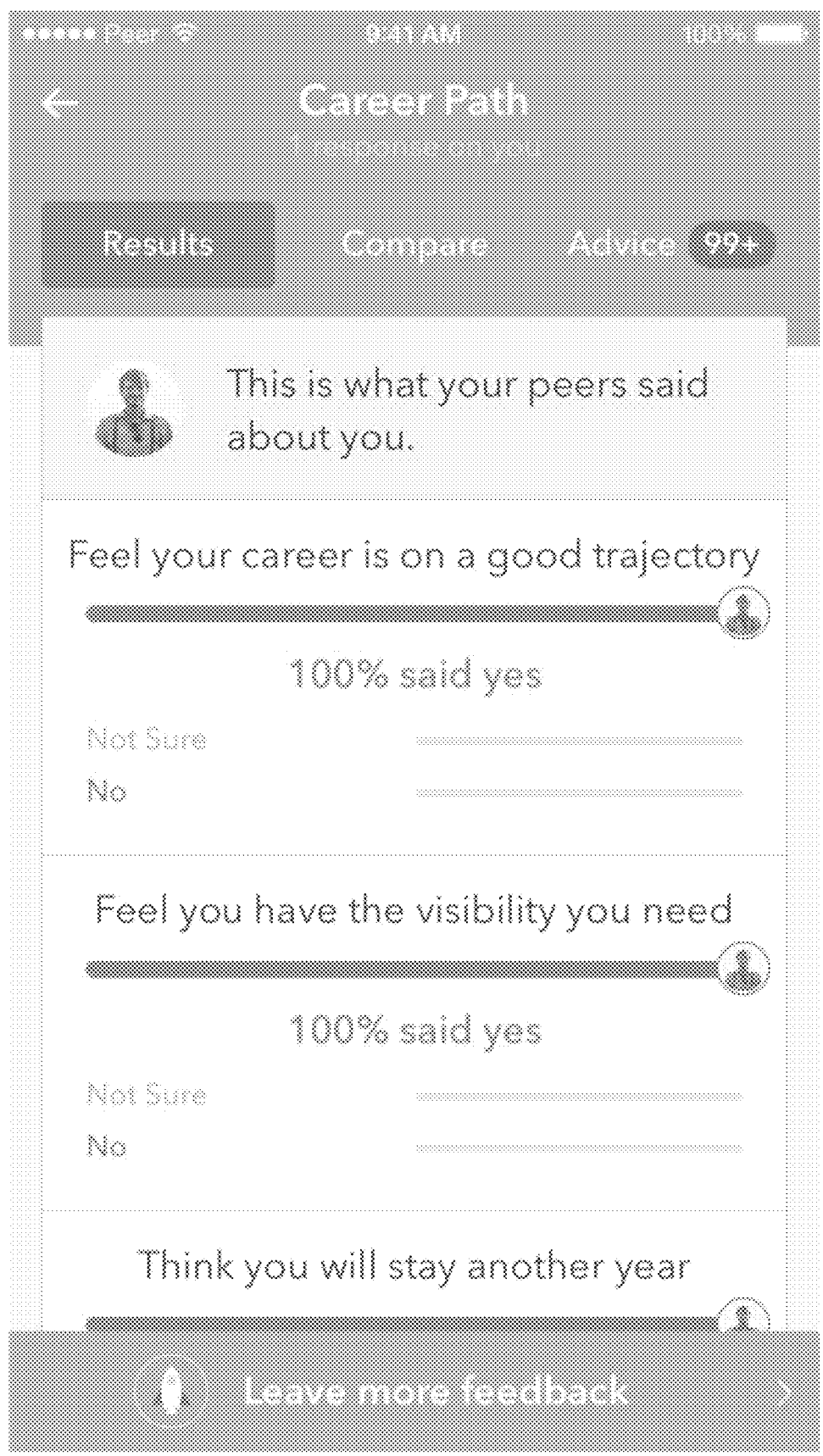
FIG. 16 illustrates a GUI allowing a user to receive work related feedback given for the user in the career path category, in accordance with another embodiment.

FIG. 16 illustrates a GUI allowing a user to receive work related feedback given for the user in the career path category, in accordance with an embodiment. For example, after the user has given a predefined threshold amount of feedback for the user's peers in the career path category, then the user may be allowed to receive feedback previously given for the user by the peers of the user (i.e. within the career path category). As an alternative, the user may first receive work related feedback given for the user by the user's peers, and then may be prompted to give feedback (e.g. in the same category as the received feedback).

Figure 17:
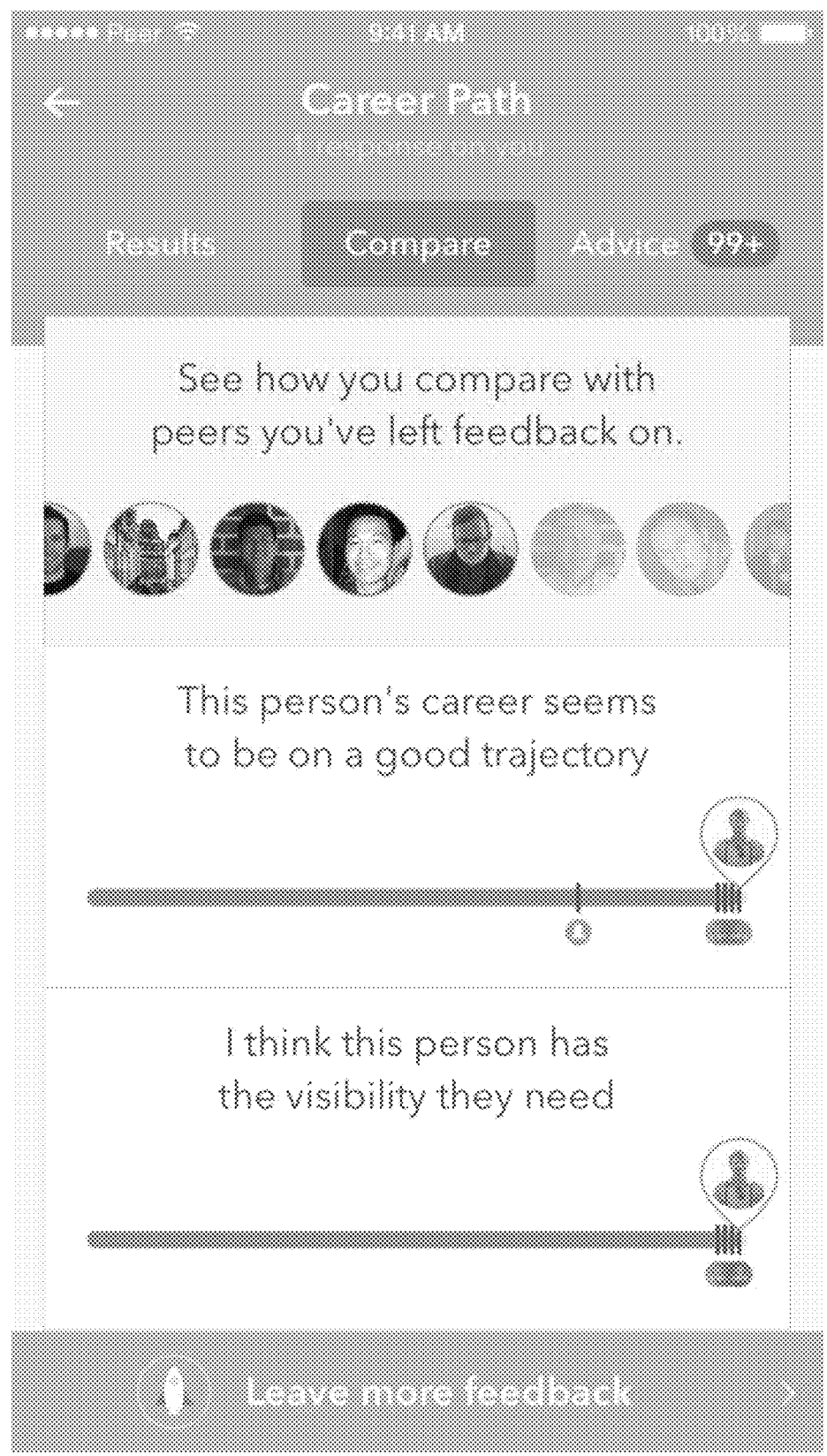
FIG. 17 illustrates a GUI allowing a user to receive a comparison of work related feedback provided for the user and work related feedback provided for peers of the user in the career path category, in accordance with yet another embodiment.

FIG. 17 illustrates a GUI allowing a user to receive a comparison of work related feedback provided for the user and work related feedback provided for peers of the user in the career path category, in accordance with an embodiment. Again, as an option, after the user has given a predefined threshold amount of feedback for the user's peers in the career path category, then the user may be allowed to view the GUI shown in FIG. 17.

Figure 18:
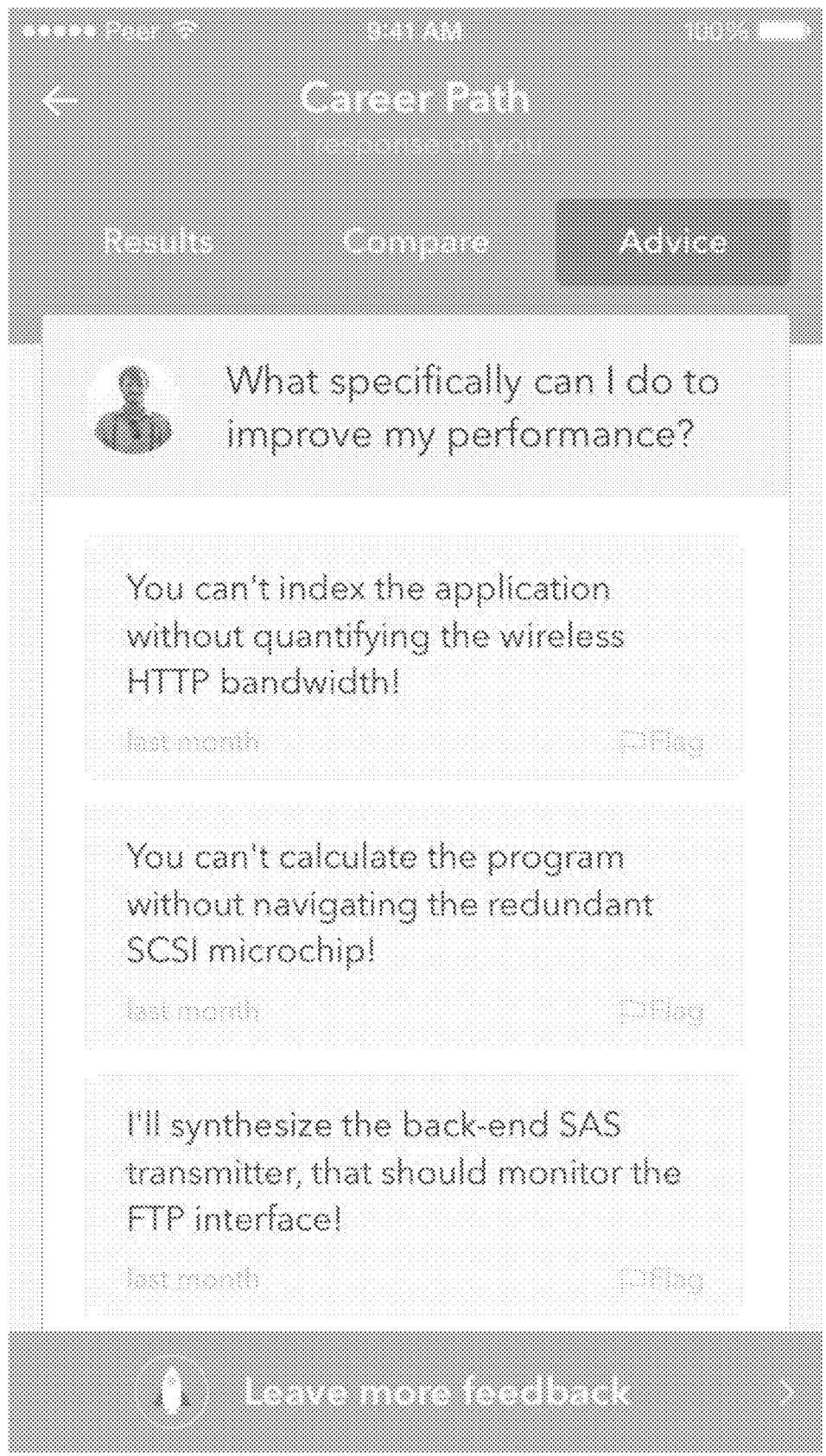
FIG. 18 illustrates a GUI allowing a user to receive work related advice given for the user in the career path category, in accordance with another embodiment.

FIG. 18 illustrates a GUI allowing a user to receive work related advice given for the user in the career path category, in accordance with an embodiment. The work related advice may be text entered by the user's peers via the GUI in FIG. 15. Yet again, the GUI of FIG. 18 may optionally only be available to the user after the user has given a predefined threshold amount of feedback for the user's peers in the career path category.

Figure 19:
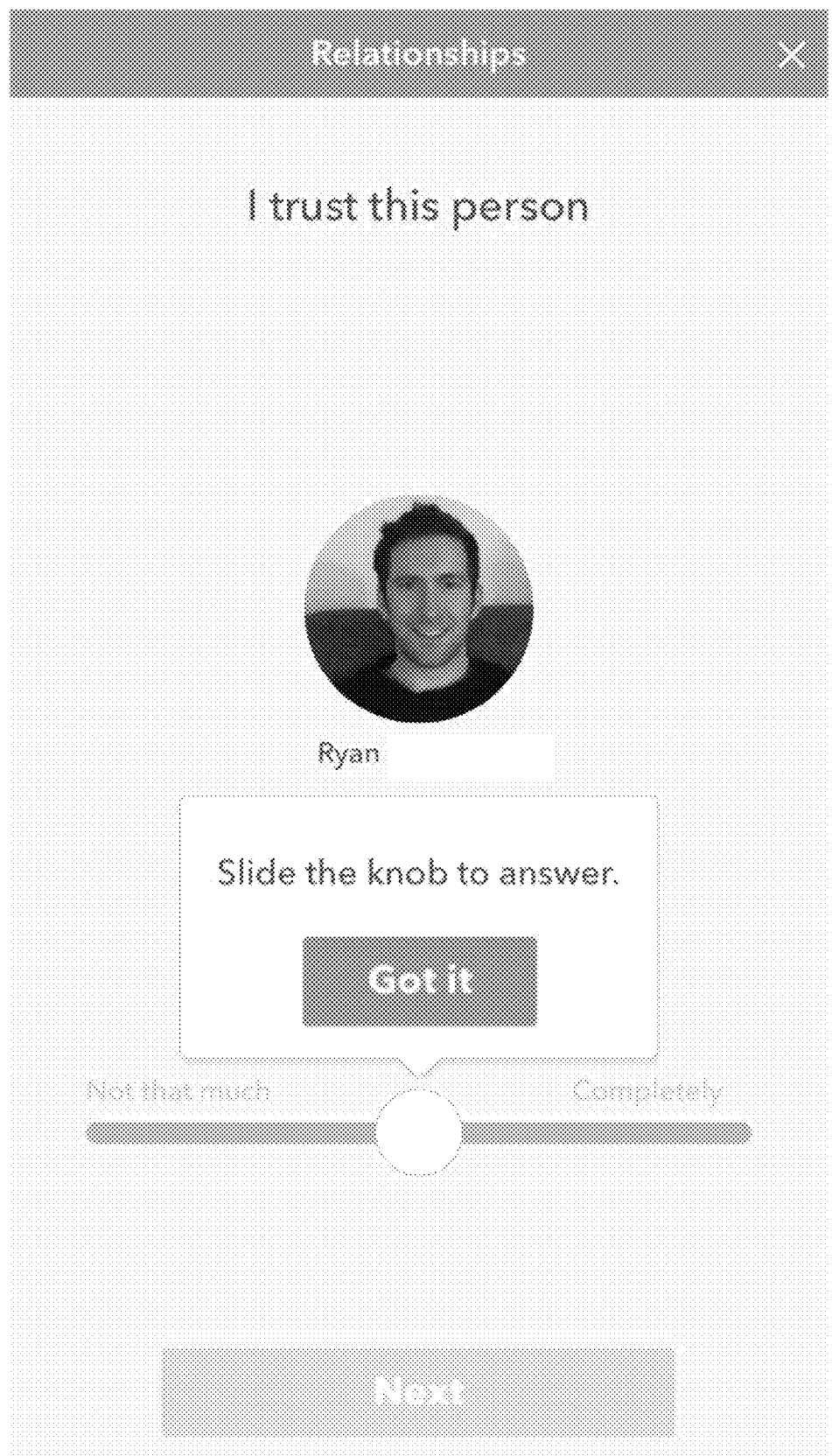
FIG. 19 illustrates a GUI allowing a user to give work related feedback for a peer within a relationships category by allowing the user to slide an icon along a bar to one of a plurality of feedback values situated along the bar, in accordance with another embodiment.

FIG. 19 illustrates a GUI allowing a user to give work related feedback for a peer within a relationships category by allowing the user to slide an icon along a bar to one of a plurality of feedback values (e.g. shown as "Not that much," etc.) situated along the bar, in accordance with an embodiment. As an option, the GUI may be displayed in response to the user selecting the relationships category displayed on the GUI of FIG. 8.

Figure 20:
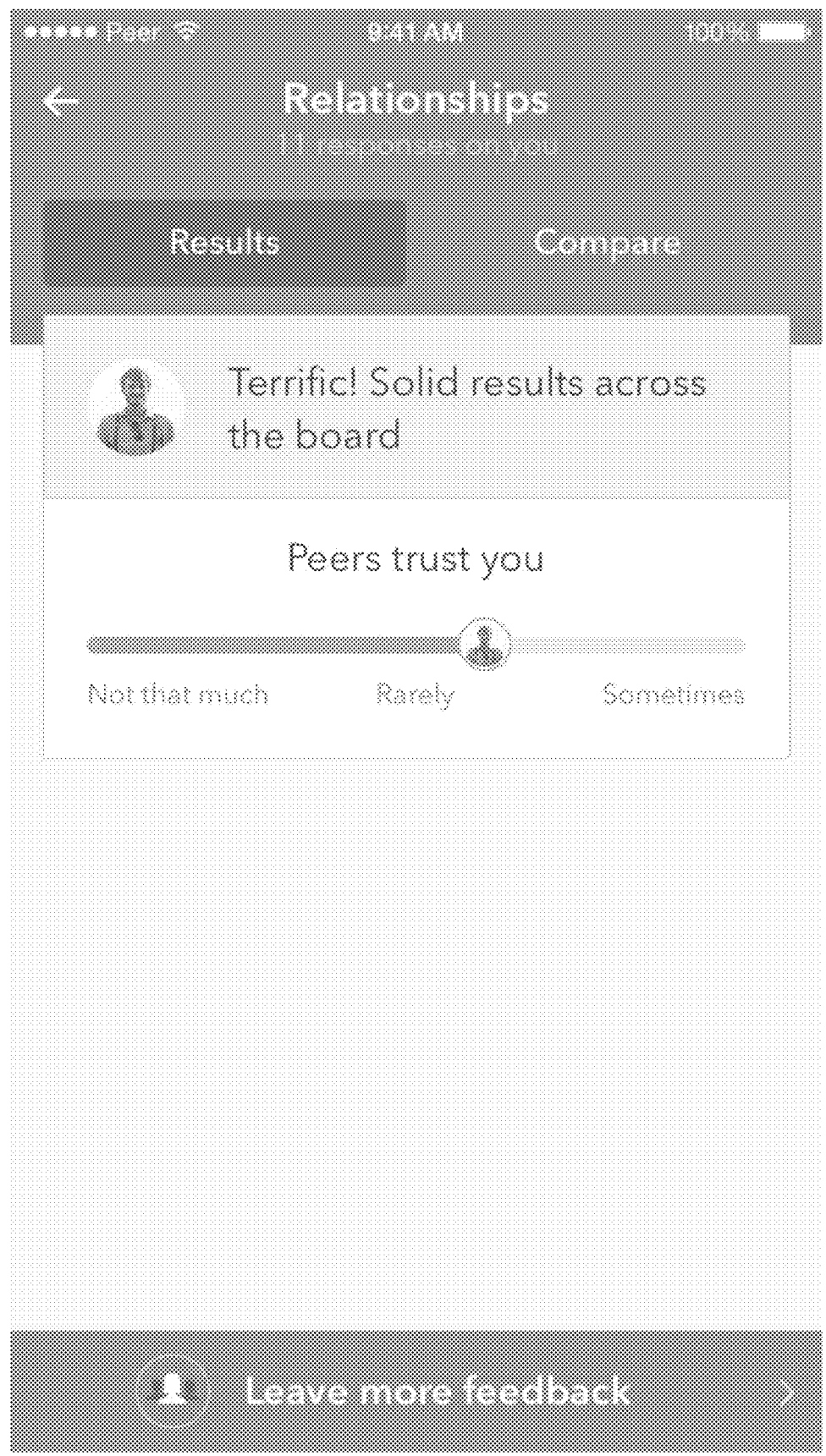
FIG. 20 illustrates a GUI allowing a user to receive work related feedback given for the user in the relationships category, in accordance with another embodiment.

FIG. 20 illustrates a GUI allowing a user to receive work related feedback given for the user in the relationships category, in accordance with another embodiment. For example, after the user has given a predefined threshold amount of feedback for the user's peers in the relationships category, then the user may be allowed to receive feedback previously given for the user by the peers of the user (i.e. within the relationships category). As an alternative, the user may first receive peer feedback given for the user, and then may be prompted to give feedback (e.g. in the same category as the received feedback).

Figure 21:
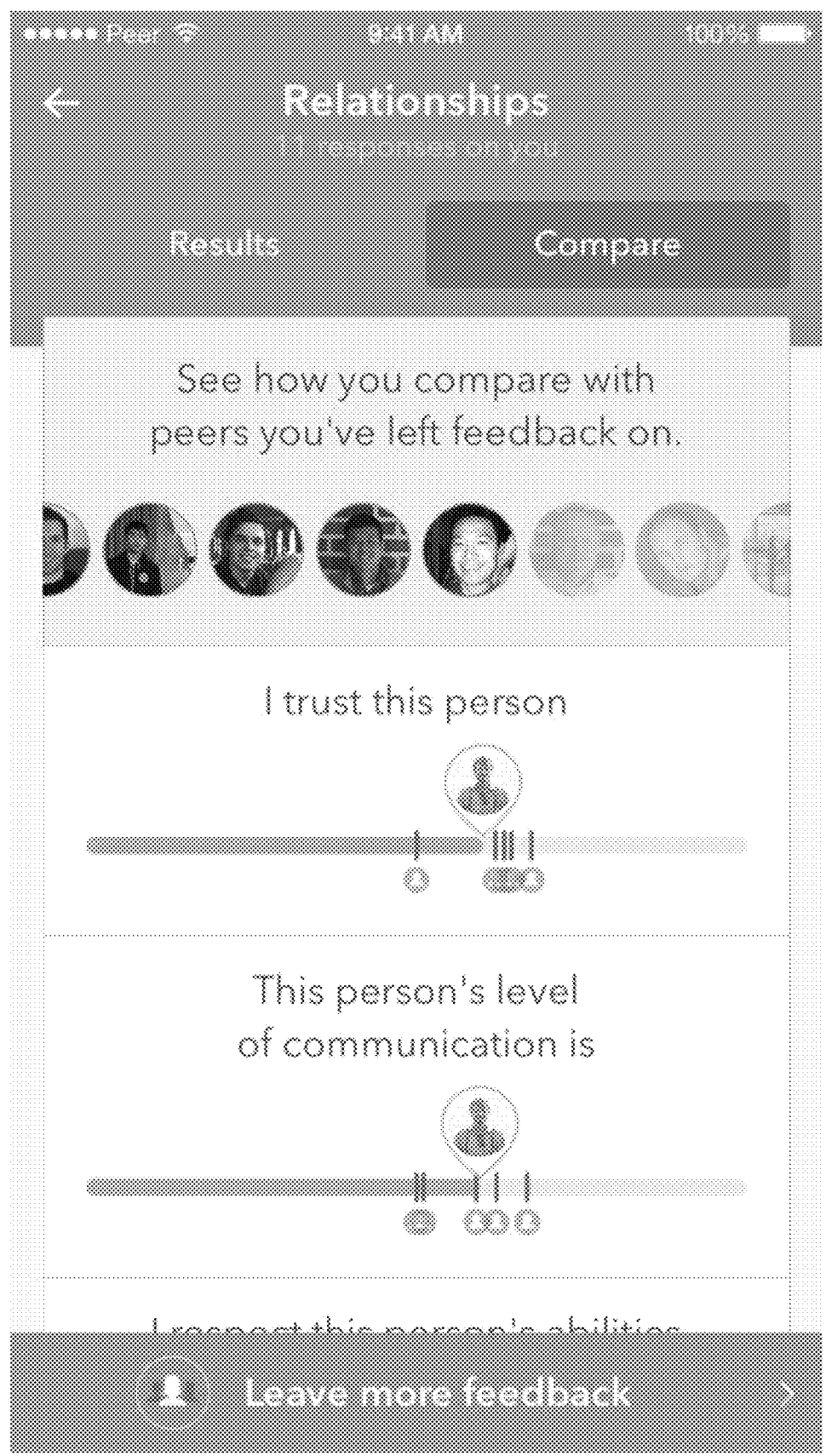
FIG. 21 illustrates a GUI allowing a user to receive a comparison of work related feedback provided for the user and work related feedback provided for peers of the user in the relationships category, in accordance with yet another embodiment.

FIG. 21 illustrates a GUI allowing a user to receive a comparison of work related feedback provided for the user and work related feedback provided for peers of the user in the relationships category, in accordance with an embodiment. Again, as an option, after the user has given a predefined threshold amount of feedback for the user's peers in the relationships category, then the user may be allowed to view the GUI shown in FIG. 21.

Figure 22:
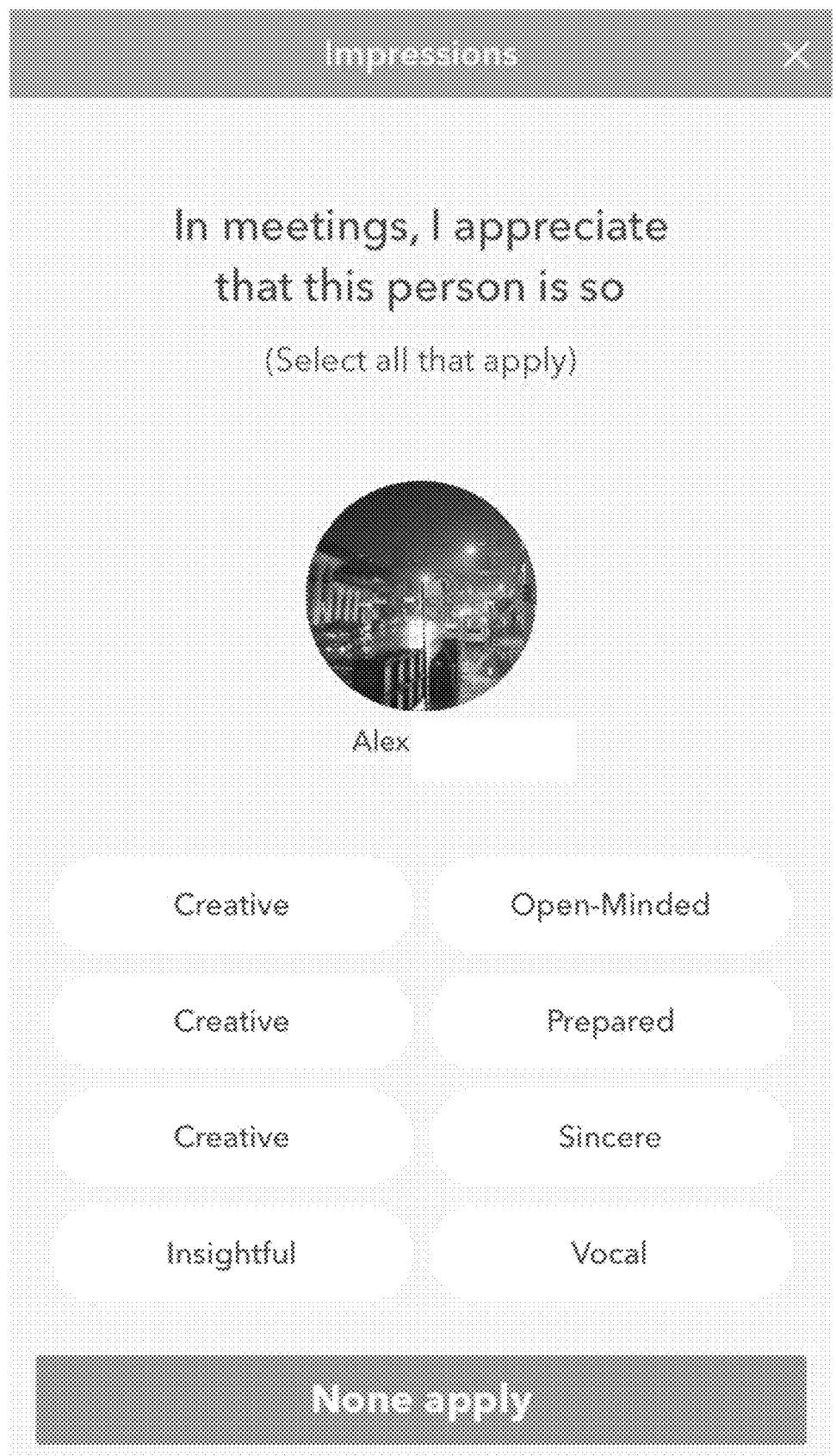
FIG. 22 illustrates a GUI allowing a user to give work related feedback for a peer within an impressions category by allowing the user to select one or more predefined feedback values, in accordance with another embodiment.

FIG. 22 illustrates a GUI allowing a user to give work related feedback for a peer within an impressions category by allowing the user to select one or more predefined feedback values (e.g. shown as "Creative," etc.), in accordance with another embodiment. As an option, the GUI may be displayed in response to the user selecting the impressions category displayed on the GUI of FIG. 8.

Figure 23:
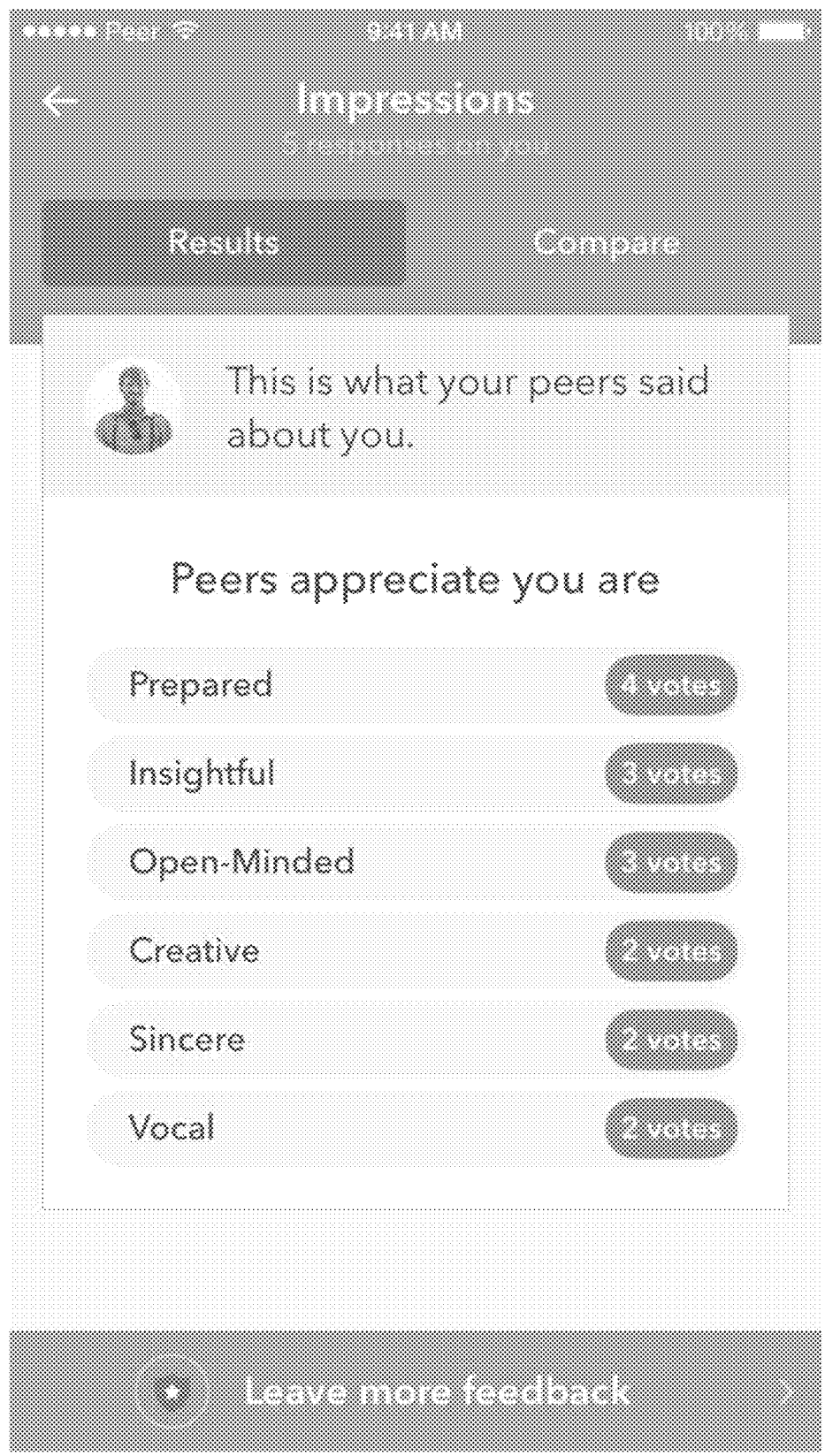
FIG. 23 illustrates a GUI allowing a user to receive work related feedback given for the user in the impressions category, in accordance with another embodiment.

FIG. 23 illustrates a GUI allowing a user to receive work related feedback given for the user in the impressions category, in accordance with another embodiment. For example, after the user has given a predefined threshold amount of feedback for the user's peers in the impressions category, then the user may be allowed to receive feedback previously given for the user by the peers of the user (i.e. within the impressions category). As an alternative, the user may first receive peer feedback given for the user, and then may be prompted to give feedback (e.g. in the same category as the received feedback).

Figure 24:
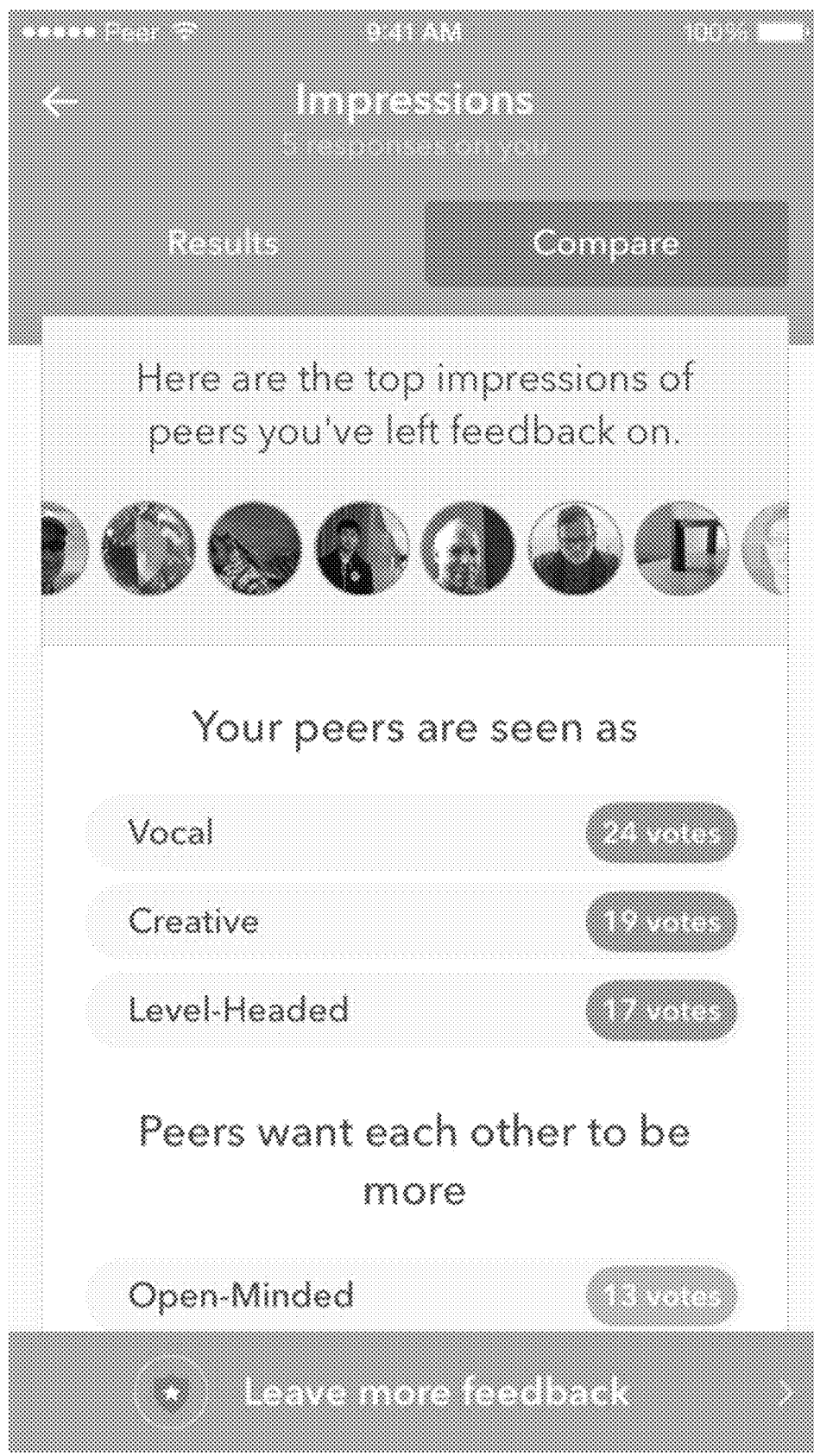
FIG. 24 illustrates a GUI allowing a user to receive a comparison of work related feedback provided for the user and work related feedback provided for peers of the user in the impressions category, in accordance with yet another embodiment.

FIG. 24 illustrates a GUI allowing a user to receive a comparison of work related feedback provided for the user and work related feedback provided for peers of the user in the impressions category, in accordance with yet another embodiment. Again, as an option, after the user has given a predefined threshold amount of feedback for the user's peers in the relationships category, then the user may be allowed to view the GUI shown in FIG. 24.

Figure 25:
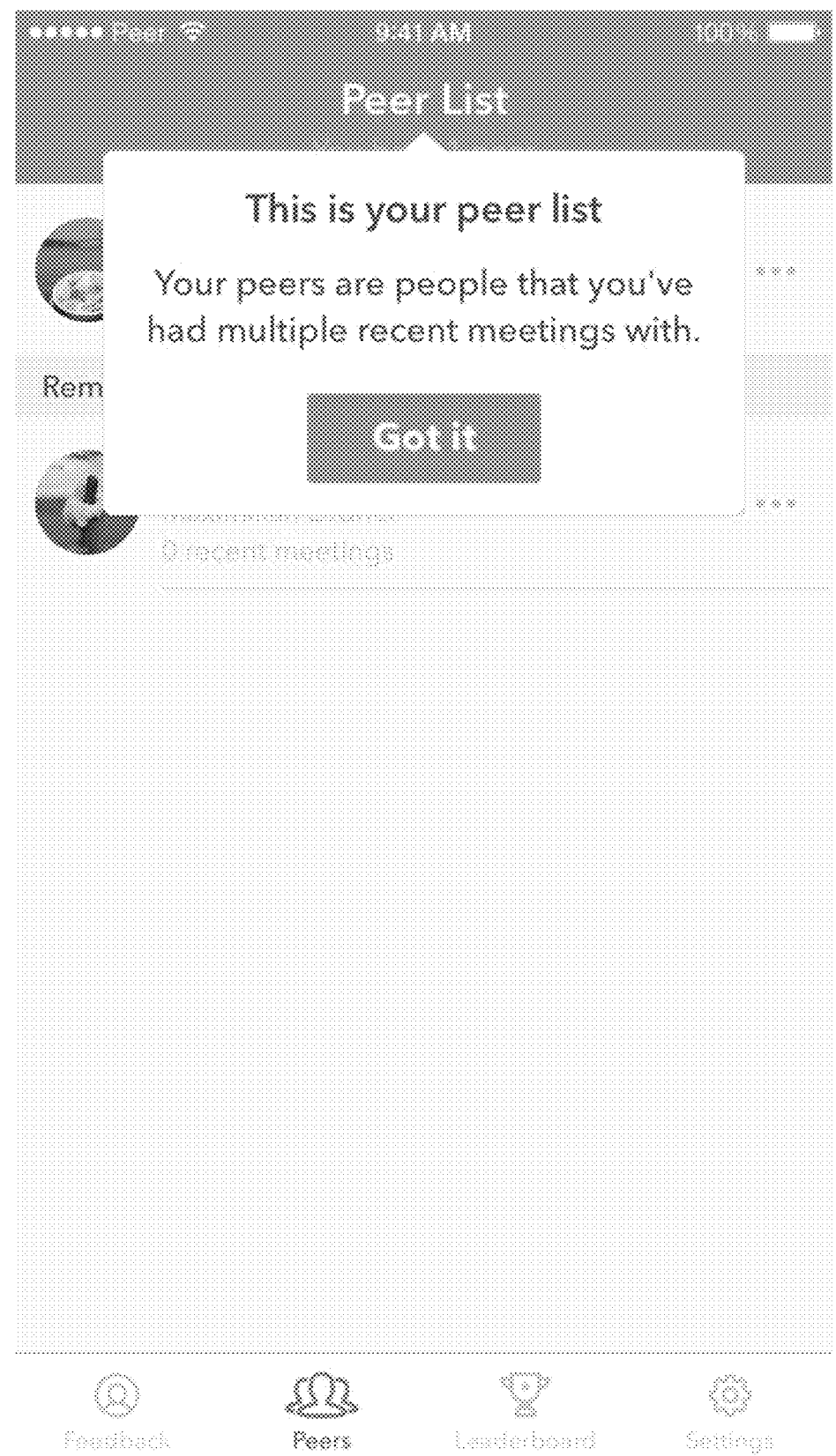
FIG. 25 illustrates a GUI allowing a user to view a list of work related peers determined for the user, in accordance with another embodiment.

FIG. 25 illustrates a GUI allowing a user to view a list of work related peers determined for the user, in accordance with an embodiment. The list may be stored in association with an account of the user, or otherwise in association with an identifier of the user. Furthermore, the list may be periodically refreshed using a calendar of the user (e.g. as described above with reference to the method 300 of FIG. 3).

Figure 26:
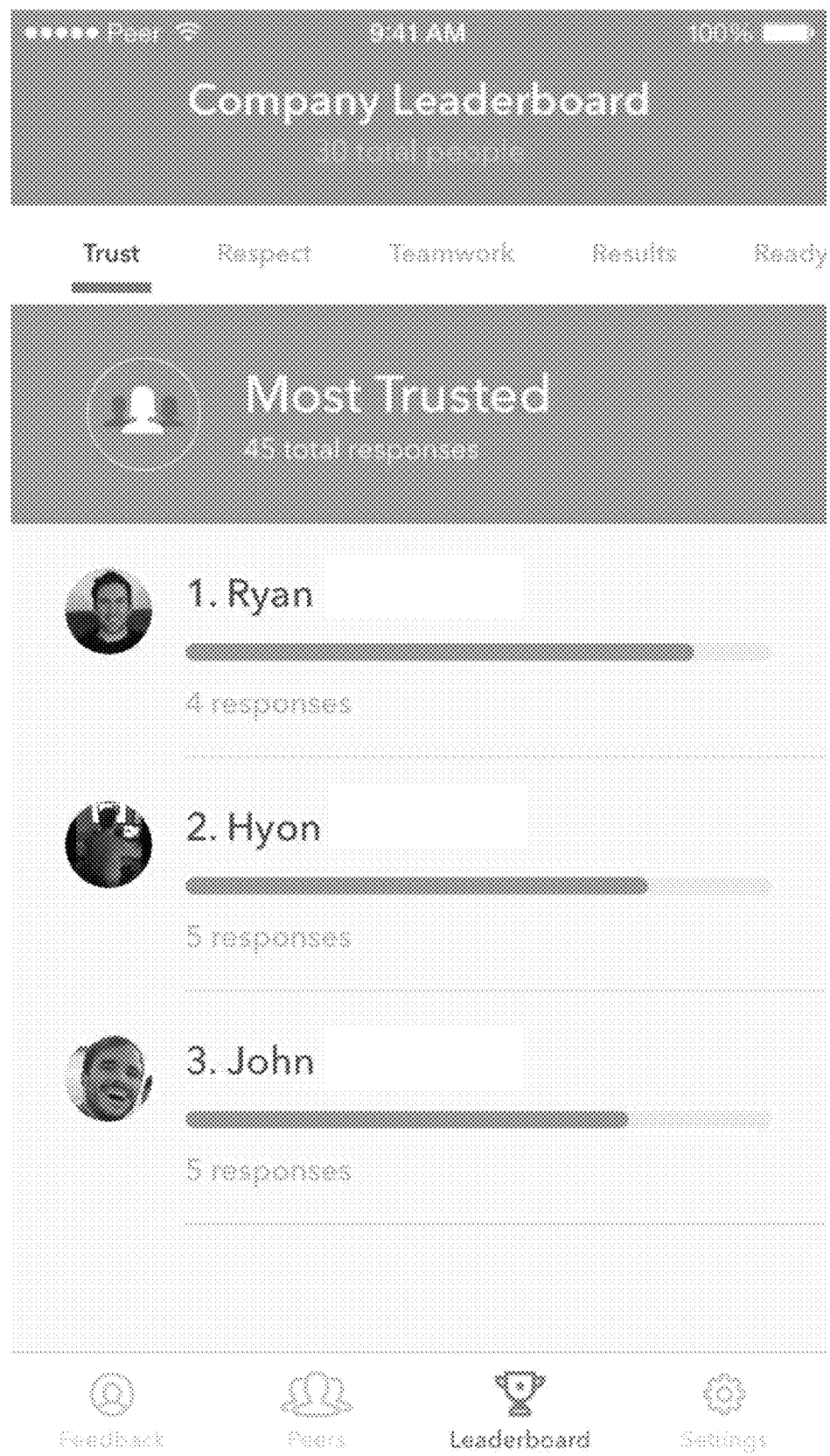
FIG. 26 illustrates a GUI allowing a user to view a work related leaderboard generated from peer feedback, in accordance with yet another embodiment.

FIG. 26 illustrates a GUI allowing a user to view a work related leaderboard generated from peer feedback, in accordance with an embodiment. As an option, the work related leaderboard may list the top rated persons within a particular work environment, as determined from work related feedback, whether or not those persons are peers of the user. Furthermore, a separate leaderboard list may be provided for above mentioned multiple different feedback categories.

Figure 27:
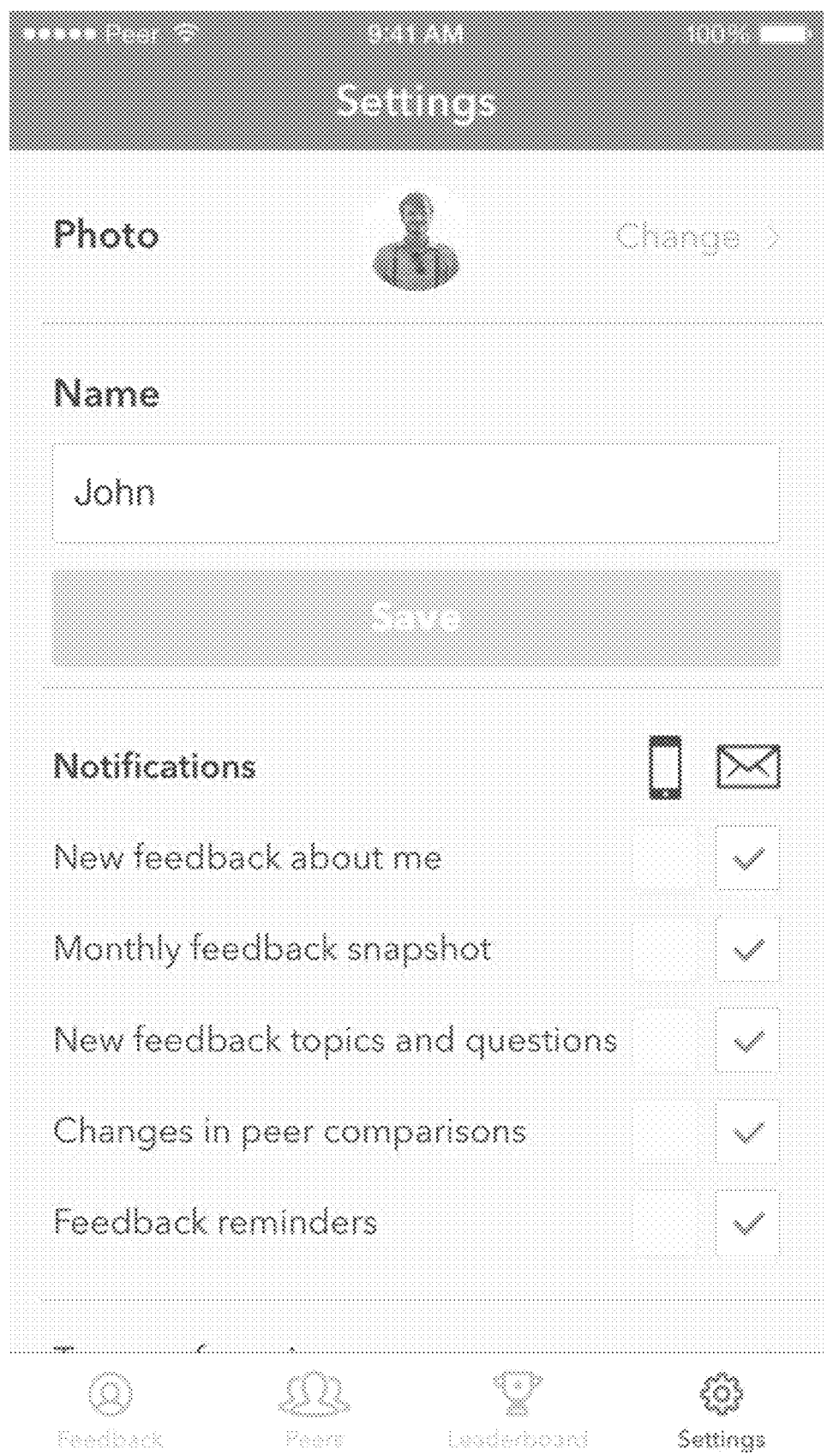
FIG. 27 illustrates a GUI allowing a user to subscribe to notifications relating to work related feedback, in accordance with still yet another embodiment.

FIG. 27 illustrates a GUI allowing a user to subscribe to notifications relating to work related feedback, in accordance with an embodiment. The notifications may be provided through email, short message service (SMS) message, or via any other methods of communication (e.g. selected by the user). In various embodiments, the notification options that the user may subscribe to may be for when new feedback has been provided for the user, for a monthly digest of feedback that has been provided for the user, etc., as shown.

Figure 28:
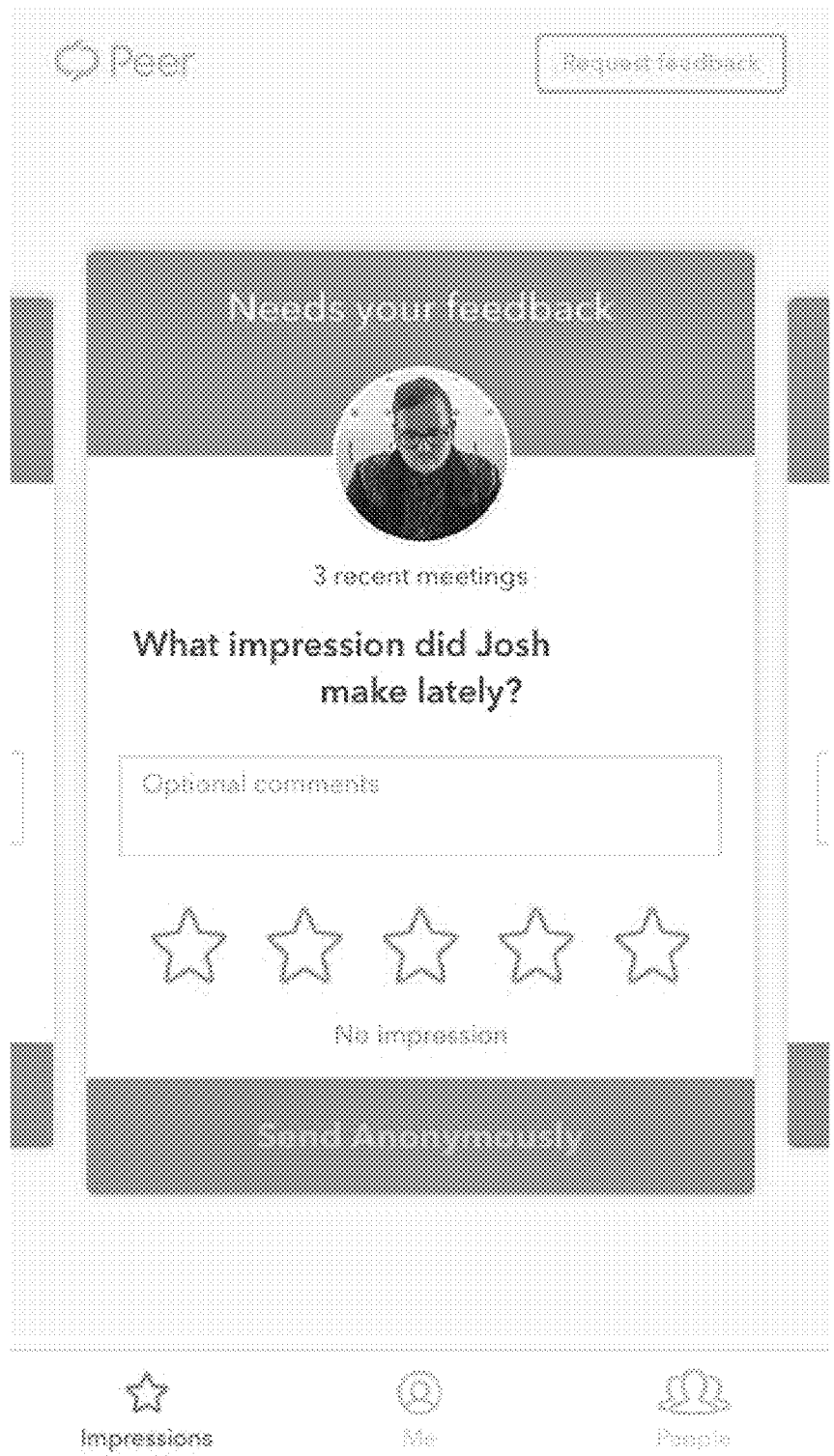
FIG. 28 illustrates a GUI allowing a user to give work related feedback provided for peers of the user in the category of recent impressions by allowing the user to tap on one to five stars (or other icons as desired), in accordance with another embodiment.

FIG. 28 illustrates a GUI allowing a user to give work related feedback provided for peers of the user in the category of recent impressions by allowing the user to tap on (i.e. select) one to five stars (or other icons as desired), in accordance with another embodiment. As an option, the GUI may be displayed in response to the user selecting the impressions category displayed on the GUI of FIG. 8.

Figure 29A:
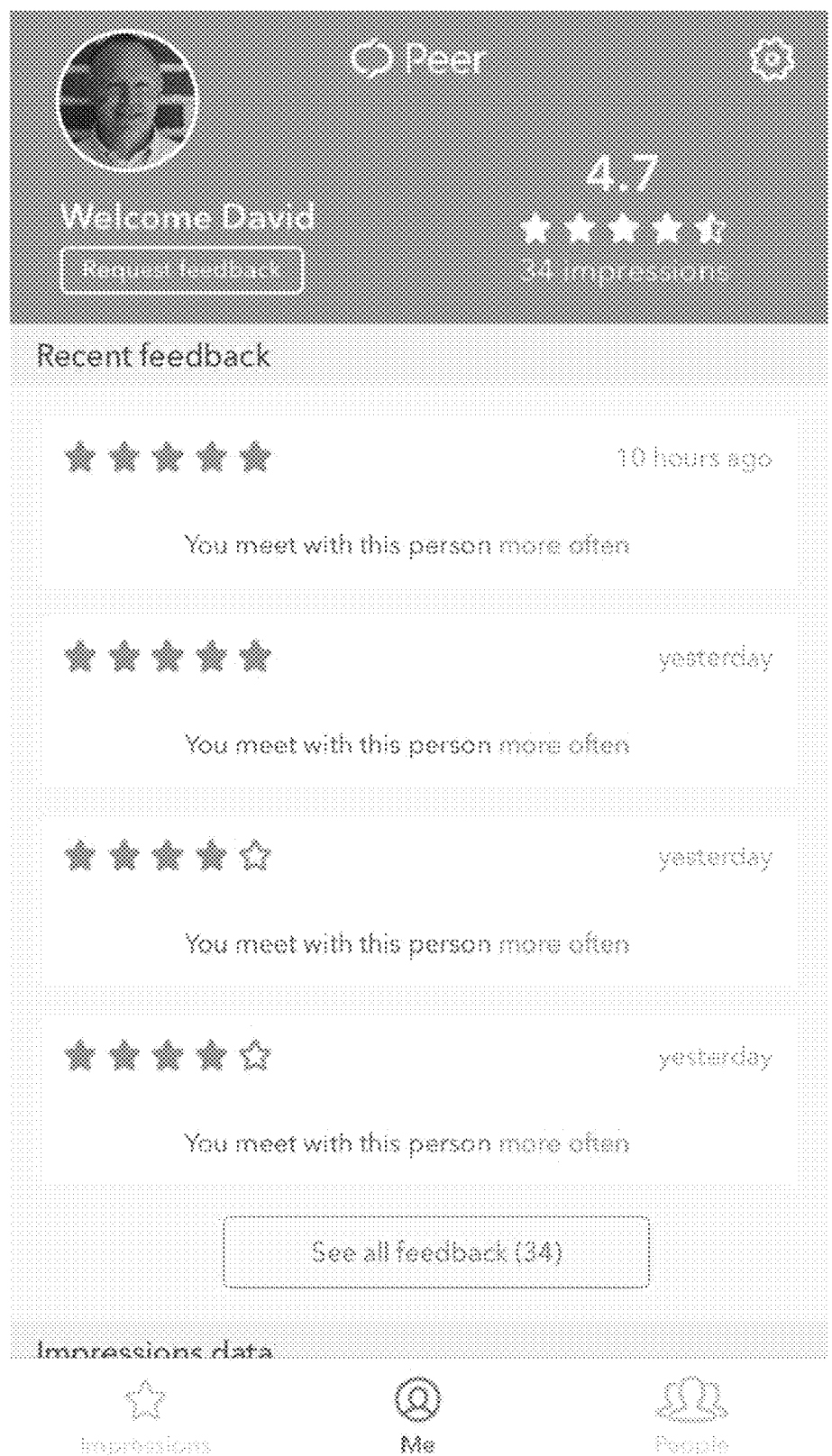
FIGS. 29A-C illustrate a GUI allowing a user to receive work related feedback given for the user across multiple feedback categories and to initiate a request for feedback from particular peers, in accordance with another embodiment.
Figure 29B:
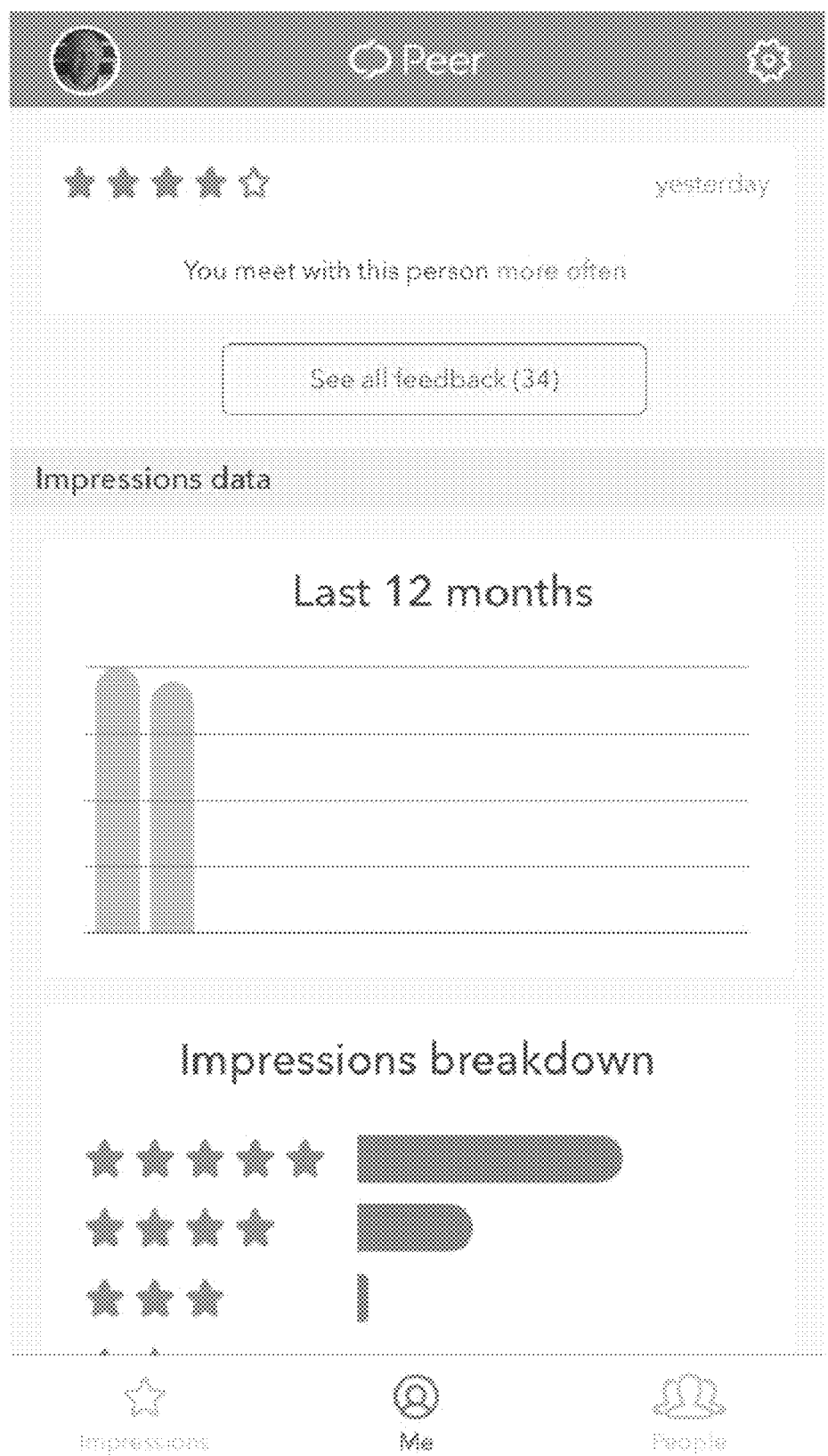
Figure 29C:
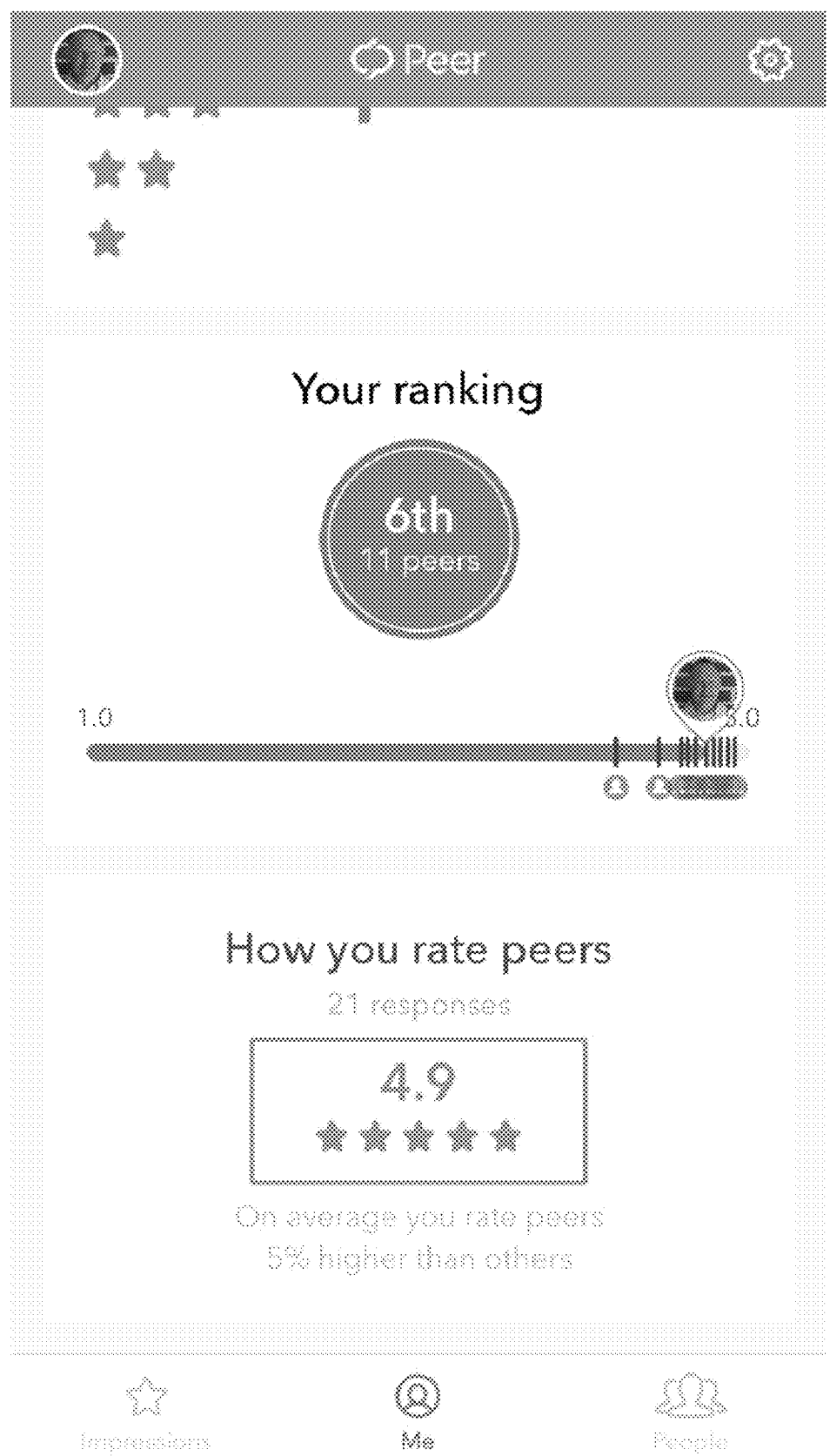

FIGS. 29A-C illustrate a GUI allowing a user to receive work related feedback given for the user across multiple feedback categories and to initiate a request for feedback from particular peers, in accordance with another embodiment. In particular, FIGS. 29A-C illustrate consecutive portions of the GUI accessible to the user by scrolling through the portions. As shown in FIG. 29A, the GUI includes an option (shown as "Request Feedback") allowing the user to initiate a request for feedback from particular peers of the user.

Figure 30:
FIG. 30 illustrates a GUI allowing a user to request feedback from particular peers, in accordance with another embodiment.

FIG. 30 illustrates a GUI allowing a user to request feedback from particular peers, in accordance with another embodiment. For example, the GUI may be displayed in response to the user selecting the request feedback option shown in FIG. 29A. As shown, the GUI displays names of multiple peers of the user, and the user is allowed to select multiple of the names for requesting feedback from those peers. Responsive to selection of the names, the peers may be notified by the system that the user has requested the feedback, and may accordingly be prompted by the system to provide the requested feedback. Where the feedback is to be anonymous, the user may be required to select at least a predefined minimum number of the displayed peer names (e.g. 5 as shown), which may allow any feedback provided by even a subset of those selected peers to be provided to the user anonymously. Of course, in an embodiment where the feedback is not anonymous, the user may be allowed to select just one, or optionally more, of the peer names. In this way, the peers may be allowed to give feedback for the user responsive to the user requesting, through the system, the feedback from the peers.

Figure 31:
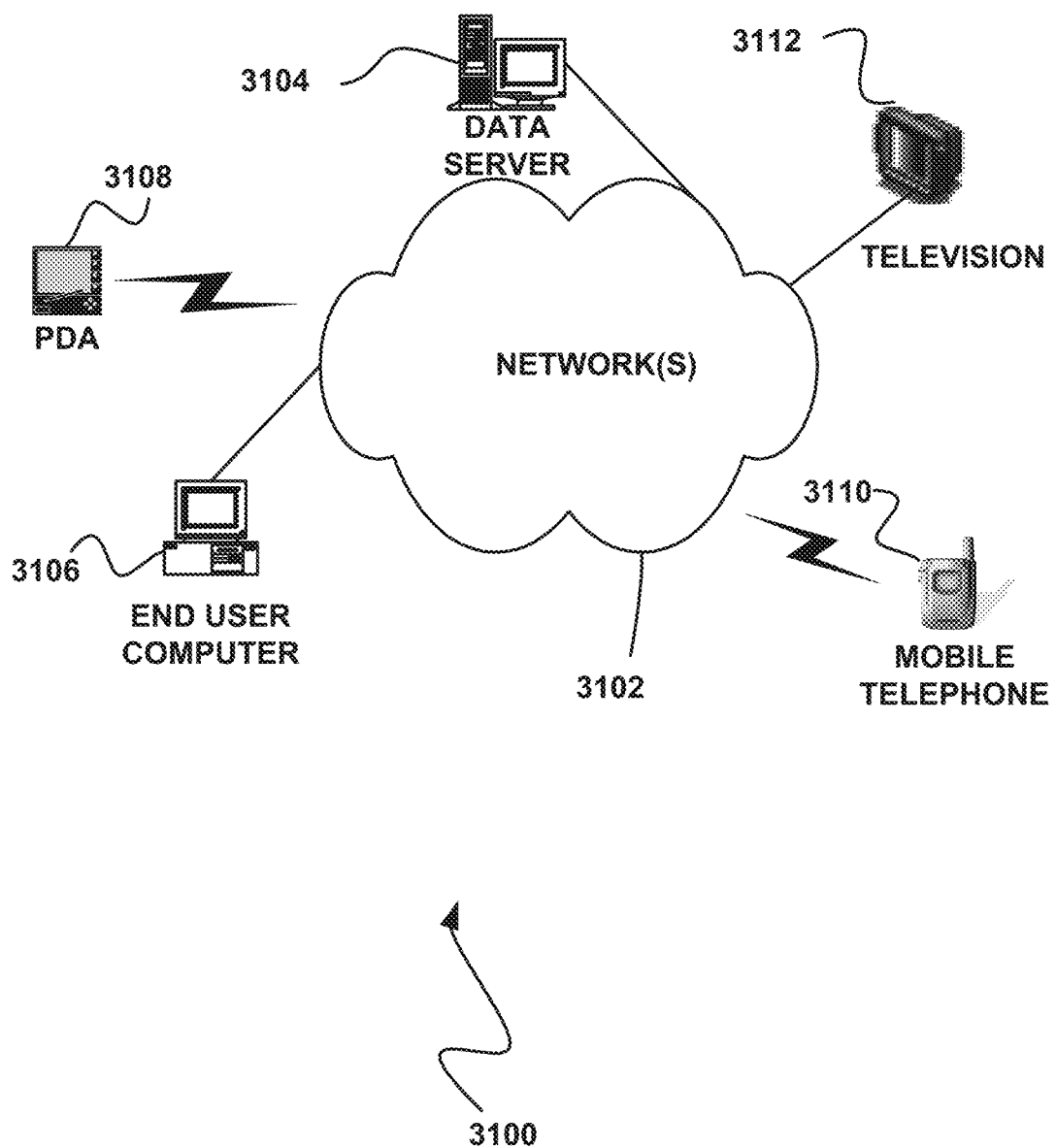
FIG. 31 illustrates a network architecture, in accordance with one possible embodiment.

FIG. 31 illustrates a network architecture 3100, in accordance with one possible embodiment in which a device of the user and the peer feedback system may be implemented. As shown, at least one network 3102 is provided. In the context of the present network architecture 3100, the network 3102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 3102 may be provided.

Coupled to the network 3102 is a plurality of devices. For example, a server computer 3104 (e.g. peer feedback system) and an end user computer 3106 (e.g. user device) may be coupled to the network 3102 for communication purposes. Such end user computer 3106 may include a desktop computer, lap-top computer, and/or any other type of logic. Still yet, various other devices may be coupled to the network 3102 including a personal digital assistant (PDA) device 3108, a mobile phone device 3110, a television 3112, etc., which all may be examples of the user device described above with respect to FIG. 1.

Figure 32:
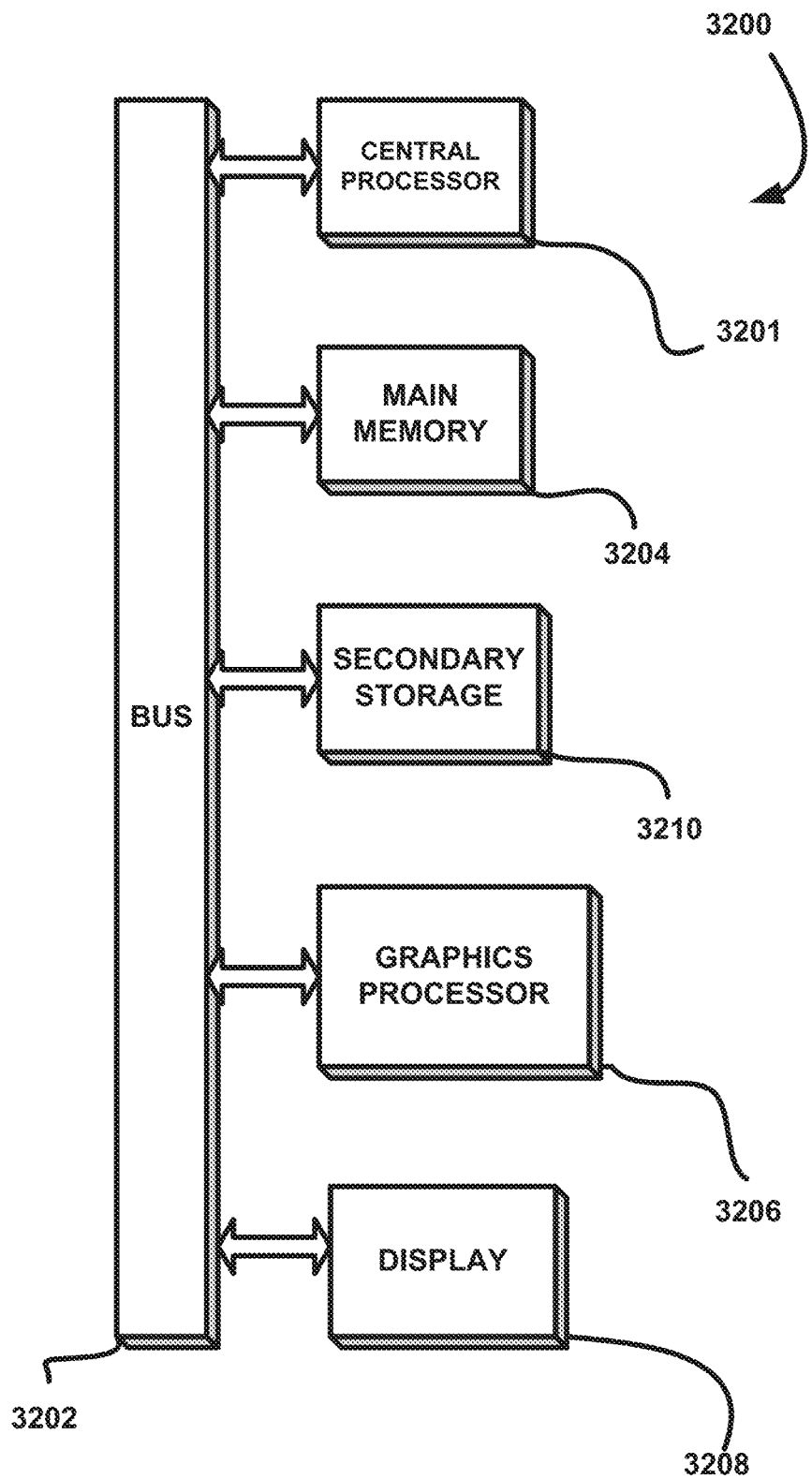
FIG. 32 illustrates an exemplary system, in accordance with one embodiment.

FIG. 32 illustrates an exemplary system 3200, in accordance with one embodiment. As an option, the system 3200 may be implemented in the context of any of the devices of the network architecture 3100 of FIG. 31. Of course, the system 3200 may be implemented in any desired environment.

As shown, a system 3200 is provided including at least one central processor 3201 which is connected to a communication bus 3202. The system 3200 also includes main memory 3204 [e.g. random access memory (RAM), etc.]. The system 3200 also includes a graphics processor 3206 and a display 3208.

The system 3200 may also include a secondary storage 3210. The secondary storage 3210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 3204, the secondary storage 3210, and/or any other memory, for that matter. Such computer programs, when executed, enable the system 3200 to perform various functions (as set forth above, for example). Memory 3204, storage 3210 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, the computer program product including computer code adapted to be executed by a computer to perform a method comprising:
    making a system accessible to a user via a network, the system having memory and at least one processor;
    accessing, by the system, an electronic calendar of the user;
    determining, by the system, a plurality of past work-related events saved to the electronic calendar of the user, each past work-related event of the plurality of past work-related events being:
        determined to have passed within a defined past time period, and
        determined as work-related based on at least one of: a category indicator included in the electronic calendar for the past work-related event, a description included in the electronic calendar for the past work-related event, or a location included in the electronic calendar of the past work-related event;
    automatically determining from the plurality of past work-related events, by the system, a plurality of individuals having a work-based relationship with the user by:
        retrieving, from each past work-related event of the plurality of past work-related events, identifiers of individuals referenced in the past work-related event,
        gathering, from the plurality of past work-related events, values of predefined parameters that are indicative of whether the plurality of individuals each have a work-based relationship with the user,
        evaluating each of the individuals in terms of one or more of the values gathered for the individual, wherein a result of the evaluation indicates a likelihood of the work-based relationship between the individual and the user, and
        determining each individual of the plurality of individuals as having the work-based relationship with the user when the likelihood of the work-based relationship indicated by the result of the evaluation of the individual meets a predefined threshold strength;
    responsive to automatically determining the plurality of individuals as having the work-based relationship with the user, storing, by the system in storage, an indication that each individual in the plurality individuals is a work-based peer of the user;
    providing, by the system to the user, one or more interfaces that allow the user to provide workplace-related feedback for one or more of the individuals determined from the past work-related event as having the work-based relationship with the user;
    receiving, by the system via the one or more interfaces, the workplace-related feedback for the one or more of the individuals;
    providing, by the system, the workplace-related feedback to the one or more of the individuals;
    determining, by the system, an upcoming work-related event saved to the electronic calendar of the user, the upcoming work-related event being:
        determined to be occurring within a defined future time period, and
        determined as work-related based on at least one of: a category indicator included in the electronic calendar for the upcoming event, a description included in the electronic calendar for the upcoming event, or a location included in the electronic calendar of the upcoming event;
    identifying, from the upcoming work-related event, one or more participants referenced in the upcoming event that are indicated in the storage as being work-based peers of the user;

retrieving, by the system, feedback previously given to the system by the one or more participants for the user; and providing, by the system, the feedback to the user in advance of the upcoming work-related event.

2. The computer program product of claim 1, wherein the system is made accessible to the user by the system providing one or more graphical user interfaces to a device of the user.

3. The computer program product of claim 1, wherein the system is made accessible to a plurality of additional users for allowing each additional user of the plurality of additional users to provide work-place related feedback to individuals having a work-based relationship with the additional user.

4. The computer program product of claim 1, wherein the user has an account with the system.

5. The computer program product of claim 1, wherein the determining the plurality of past work-related events saved to the electronic calendar of the user is performed at a scheduled interval.

6. The computer program product of claim 1, wherein when a particular individual of the individuals having the work-based relationship with the user does not have an account with the system and the user provides the workplace-related feedback for the particular individual, the system is prompted to send an electronic message to the particular individual inviting the particular individual to create an account with the system for viewing the workplace-related feedback.

7. The computer program product of claim 1, wherein the workplace-related feedback is provided to the one or more of the individuals anonymously, such that the system does not inform the one or more of the individuals that the workplace-related feedback was provided by the user.

8. The computer program product of claim 1, wherein the workplace-related feedback is provided to each individual of the one or more of the individuals, by the system, when the individual has an account with the system.

9. The computer program product of claim 1, further comprising allowing, by the system, the user to receive workplace-related feedback about the user that is provided by one or more of the individuals.

10. The computer program product of claim 9, wherein the system allows the user to receive the workplace-related feedback about the user only in response to the system determining that the workplace-related feedback provided by the user exceeds a threshold amount.

11. The computer program product of claim 1, wherein providing the one or more interfaces that allow the user to provide the workplace-related feedback for the one or more individuals includes:
providing a graphical user interface to a device of the user, the graphical user interface displaying an image for an individual of the one or more individuals; and
wherein the workplace-related feedback is received for the individual by the graphical user interface allowing the user to interact with the image.

12. The computer program product of claim 11, wherein allowing the user to interact with the image includes:
providing, with the image, a plurality of predetermined feedback values; and
allowing the user to select one or more of the predetermined feedback values for providing the workplace-related feedback by moving the image of the one of the individuals to the one or more of the predetermined feedback values.

13. The computer program product of claim 1, wherein the one or more interfaces are provided to the user responsive to the system proactively selecting the one or more individuals for allowing the user to give the workplace-related feedback therefore.

14. A method, comprising:
making a system accessible to a user via a network, the system having memory and at least one processor;
accessing, by the system, an electronic calendar of the user;
determining, by the system, a plurality of past work-related events saved to the electronic calendar of the user, each past work-related event of the plurality of past work-related events being:
determined to have passed within a defined past time period, and
determined as work-related based on at least one of: a category indicator included in the electronic calendar for the past work-related event, a description included in the electronic calendar for the past work-related event, or a location included in the electronic calendar of the past work-related event;
automatically determining from the plurality of past work-related events, by the system, a plurality of individuals having a work-based relationship with the user by:
retrieving, from each past work-related event of the plurality of past work-related events, identifiers of individuals referenced in the past work-related event,
gathering, from the plurality of past work-related events, values of predefined parameters that are indicative of whether the plurality of individuals each have a work-based relationship with the user,
evaluating each of the individuals in terms of one or more of the values gathered for the individual, wherein a result of the evaluation indicates a likelihood of the work-based relationship between the individual and the user, and
determining each individual of the plurality of individuals as having the work-based relationship with the user when the likelihood of the work-based relationship indicated by the result of the evaluation of the individual meets a predefined threshold strength;
responsive to automatically determining the plurality of individuals as having the work-based relationship with the user, storing, by the system in storage, an indication that each individual in the plurality individuals is a work-based peer of the user;
providing, by the system to the user, one or more interfaces that allow the user to provide workplace-related feedback for one or more of the individuals determined from the plurality of past work-related events as having the work-based relationship with the user;
receiving, by the system via the one or more interfaces, the workplace-related feedback for the one or more of the individuals;
providing, by the system, the workplace-related feedback to the one or more of the individuals;
determining, by the system, an upcoming work-related event saved to the electronic calendar of the user, the upcoming work-related event being:
determined to be occurring within a defined future time period, and
determined as work-related based on at least one of: a category indicator included in the electronic calendar for the upcoming event, a description included in the electronic calendar for the upcoming event, or a location included in the electronic calendar of the upcoming event;

identifying, from the upcoming work-related event, one or more participants referenced in the upcoming event that are indicated in the storage as being work-based peers of the user;

retrieving, by the system, feedback previously given to the system by the one or more participants for the user; and providing, by the system, the feedback to the user in advance of the upcoming work-related event.

15. A system, comprising:

memory; and at least one processor for:

making the system accessible to a user via a network;

accessing an electronic calendar of the user;

determining a plurality of past work-related events saved to the electronic calendar of the user, each past work-related event of the plurality of past work-related events being:
- determined to have passed within a defined time period, and
- determined as work-related based on at least one of: a category indicator included in the electronic calendar for the past work-related event, a description included in the electronic calendar for the past work-related event, or a location included in the electronic calendar of the past work-related event;

automatically determining from the plurality of past work-related events a plurality of individuals having a work-based relationship with the user by:
- retrieving, from each past work-related event of the plurality of past work-related events, identifiers of individuals referenced in the past work-related event,
- gathering, from the plurality of past work-related events, values of predefined parameters that are indicative of whether the plurality of individuals each have a work-based relationship with the user,
- evaluating each of the individuals in terms of one or more of the values gathered for the individual, wherein a result of the evaluation indicates a likelihood of the work-based relationship between the individual and the user, and
- determining each individual of the plurality of individuals as having the work-based relationship with the user when the likelihood of the work-based relationship indicated by the result of the evaluation of the individual meets a predefined threshold strength;

responsive to automatically determining the plurality of individuals as having the work-based relationship with the user, storing, by the system in storage, an indication that each individual in the plurality individuals is a work-based peer of the user;

providing, to the user, one or more interfaces that allow the user to provide workplace-related feedback for one or more of the individuals determined from the past work-related event as having the work-based relationship with the user;

receiving, via the one or more interfaces, the workplace-related feedback for the one or more of the individuals;

providing the workplace-related feedback to the one or more of the individuals;

determining an upcoming work-related event saved to the electronic calendar of the user, the upcoming work-related event being:
- determined to be occurring within a defined future time period, and
- determined as work-related based on at least one of: a category indicator included in the electronic calendar for the upcoming event, a description included in the electronic calendar for the upcoming event, or a location included in the electronic calendar of the upcoming event;

identifying, from the upcoming work-related event, one or more participants referenced in the upcoming event that are indicated in the storage as being work-based peers of the user;

retrieving, by the system, feedback previously given to the system by the one or more participants for the user; and providing, by the system, the feedback to the user in advance of the upcoming work-related event.

* * * * *